US006959348B1

(12) United States Patent
Chan et al.

(10) Patent No.: US 6,959,348 B1
(45) Date of Patent: Oct. 25, 2005

(54) METHOD AND SYSTEM FOR ACCESSING DATA

(75) Inventors: Jason Chan, Markham (CA); Indra Laksono, Richmond Hill (CA)

(73) Assignee: VIXS Systems, Inc., Toronto (CA)

( * ) Notice: Subject to any disclaimer, the term of this patent is extended or adjusted under 35 U.S.C. 154(b) by 677 days.

(21) Appl. No.: 09/918,384

(22) Filed: Jul. 30, 2001

(51) Int. Cl.[7] .............................................. H04N 7/12
(52) U.S. Cl. ..................................... 710/65; 375/240.3
(58) Field of Search ..................... 710/62–71; 375/240; 725/1.35

(56) References Cited

U.S. PATENT DOCUMENTS

| 5,115,812 | A | * | 5/1992 | Sano et al. ................. 600/419 |
| 5,740,028 | A | * | 4/1998 | Sugiyama et al. ........... 725/149 |
| 5,940,130 | A | * | 8/1999 | Nilsson et al. ......... 375/240.12 |
| 5,996,029 | A | * | 11/1999 | Sugiyama et al. ............ 710/15 |
| 6,081,295 | A | * | 6/2000 | Adolph et al. ......... 375/240.03 |
| 6,182,203 | B1 | * | 1/2001 | Simar et al. .................. 712/22 |
| 6,263,022 | B1 | * | 7/2001 | Chen et al. ............ 375/240.03 |
| 6,314,138 | B1 | * | 11/2001 | Lemaguet .................... 375/240 |
| 2003/0152148 | A1 | * | 8/2003 | Laksono ................ 375/240.24 |

OTHER PUBLICATIONS

Pedro Assuncao and Mohammad Ghanbari, "Rate Reduction Techniques for MPEG-2 Video Bit Streams," SPIE vol. 2952, Apr. 1996, 10 pp.

Jae–Young Pyun, "QoS Provisioning for Video Streaming over IEEE 802.11 Wireless LAN," (abridge) IEEE Conference in Consumer Electronics, Jun. 16, 2003, 3 pp. [online] Retrieved from the Internet Jul. 8, 2003 at URL.

Krisda Lengwehasatit and Antonio Ortega, "Computationally Scalable Partial Distance Based Fast Search Motion Estimation," Univ. of Southern California, 4 pp., (date unknown).

(Continued)

Primary Examiner—Christopher B. Shin
(74) Attorney, Agent, or Firm—Toler, Larson & Abel, LLP

(57) ABSTRACT

A system and a method for transcoding multiple media channels is disclosed herein. The system includes a first processor to parse a media data stream having one or more media data channels and a vector processor to decompress, scale, and then compress the parsed media channel. A parsed media data channel, in one embodiment, is accessed using a bit manipulator and packetized into decoder instruction packets and transmitted to the vector processor using a sequencer. The vector processor decompresses the decoder instruction packets, scales a macroblock generated from the packets, and then compresses the scaled macroblock. As a result, the scaled and compressed output has less data associated with the media channel, allowing for faster and/or more efficient storage or transmission. A reduced sized scale buffer is associated with another disclosed embodiment.

2 Claims, 21 Drawing Sheets

OTHER PUBLICATIONS

Manoj Aggarwal and Ajai Narayan, "Efficient Huffman Decoding," 2000 IEEE, 0–7803–6297–7, pp. 936–939.

Peng Yin et al., "Video Transcoding by Reducing Spatial Resolution," Princeton University, Princeton, NJ, 4 pp., 2000.

Zhigang Fan and Ricardo de Queiroz, "Maximum Likelihood Estimation of JPEG Quantization Table in the Identification of Bitmap Compression History," Xerox Corporation, Webster, NY, 4 pp. (date known).

Luis Ducla Soares et al., "Influence of Encoder Parameters on the Decoded Video Quality for MPEG–4 Over W–CDMA Mobile Networks," NTT DoCoMo, Inc. technical paper, 4 pp. (date unknown).

Thomas Wiegand et al., "Long–Term Memory MotionCompensated Prediction for Rubust Video Transmittion," in Proc. ICIP2000, 4 pp.

P. Greg Sherwood et al., "Efficient Image and Channel Coding for Wireless Packet Networks," Univ. of CA, San Diego, CA, 4 pp. (date unknown).

Donghoon Yu et al., "Fast Motion Estimation for Shape Coding in MPEG–4," 2003 IEEE Transactions on Circuits and Systems for Video Technology, vol. 13, No. 4, Apr. 2003, pp. 358–363.

* cited by examiner

METHOD AND SYSTEM FOR ACCESSING DATA

CO-PENDING APPLICATIONS

This application is related to U.S. patent application Ser. No. 09/819,147 entitled "DEVICE AND METHOD FOR COMPRESSION OF A VIDEO STREAM," filed Mar. 27, 2001; U.S. patent application Ser. No. 09/918,380 entitled "SYSTEM AND METHOD FOR MULTIPLE CHANNEL VIDEO," filed Jul. 30, 2001; and U.S. patent application Ser. No. 09/917,967 entitled "SYSTEM AND METHOD FOR MULTIPLE CHANNEL VIDEO TRANSCODING," filed Jul. 30, 2001.

FIELD OF THE DISCLOSURE

The present invention relates generally to the processing of video data, and more specifically to specific methods and devices for processing video data.

BACKGROUND

The use of data processors to manipulate data is well known. Many general purpose data processors include the ability to manipulate specific bits of data by loading data into one or more registers and executing various rotation commands, masking commands, and logic commands. Examples of general purpose data processors used to implement a wide variety of specific functions include Reduced Instruction Set Computer (RISC) microprocessors, Complex Instruction Set Computer (CISC) microprocessors, and microcontrollers.

General purpose processors are generally limited in their ability to execute real-time applications that require bit processing. For example, a general purpose data processor performing an application that includes manipulating compressed data will generally access specific bits of a data word before a desired operation can be performed on the data. The specific bits are accessed by loading the data word, or words, containing the specific bits to be accessed into registers of the general purpose data processor and a sequence of operations is performed using the registers to obtain the required bits. The time taken to implement these steps can limit the type of real-time operations that can be supported by the data processor. In applications requiring high-speed real-time operations, such as display of video/graphics, this problem is more pronounced. Therefore, a method and/or system that allows for efficient bit manipulation by a general purpose data processor would be useful.

DETAILED DESCRIPTION OF THE FIGURES

In accordance with at least one embodiment of the present invention, a system for transcoding is provided. The system includes a first general purpose processor to receive digital video data and provide parsed video data. The system further includes a second processor coupled to the first processor to access the parsed video data, the second processor includes a video transcoder. An advantage of the present invention is that media channels may be efficiently received and transcoded. Another advantage is that real-time playback of video channels is more efficiently supported.

FIGS. 1–5 illustrate a system and method for transcoding multiple media channels. The system includes a first processor to parse a media data stream having one or more media channels and a vector processor to decompress, scale, and then compress the parsed media channel. The parsed media channel, in one embodiment, is packetized into decoder instruction packets and transmitted to the vector processor using a sequencer. The vector processor decompresses the decoder instruction packets, scales a macroblock generated from the packets, and then compresses the scaled results. As a result, the scaled and compressed output has less data associated with the media channel, allowing for faster and/or more efficient storage or transmission.

Figure 1:
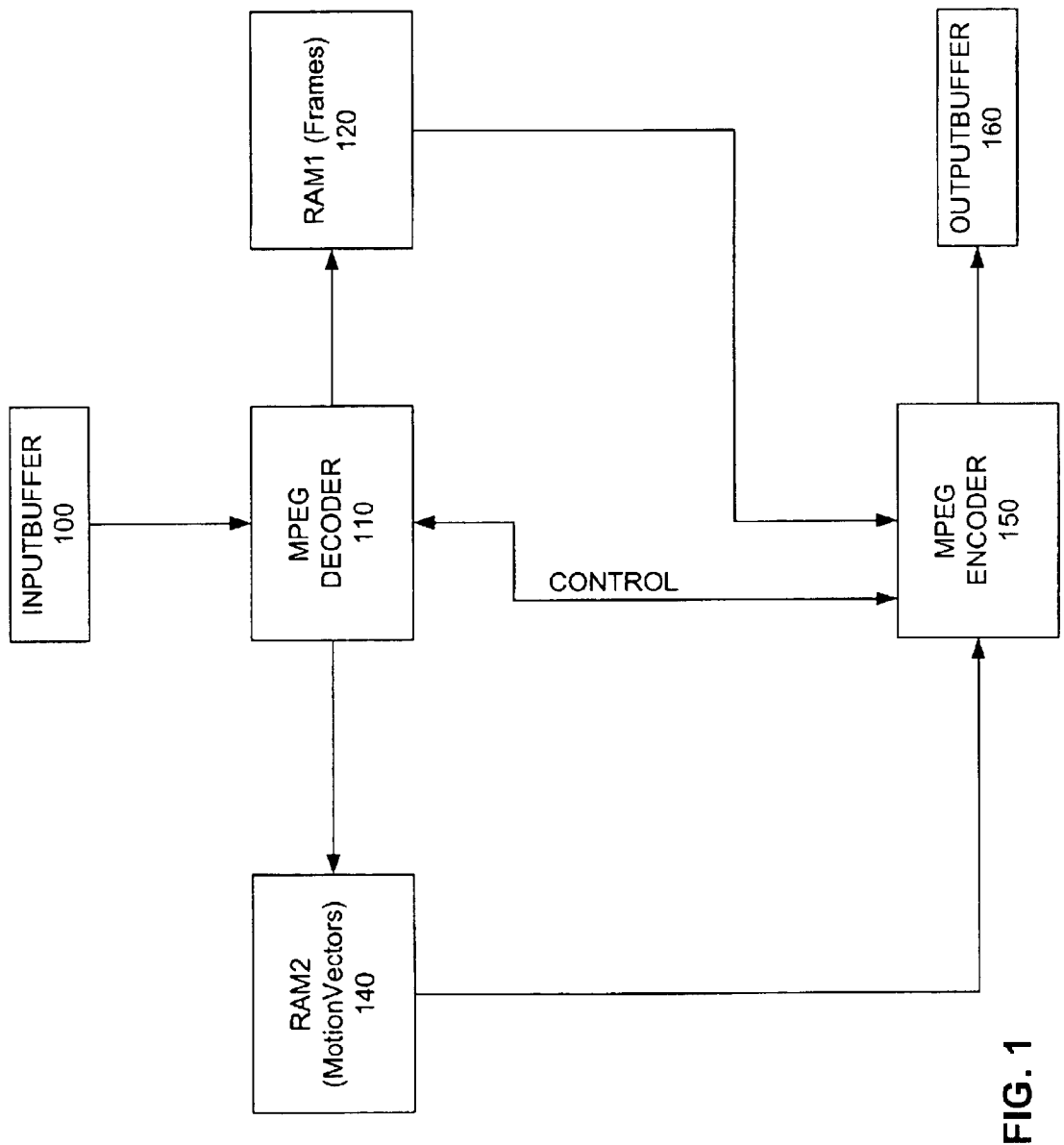
FIG. 1 is a block diagram illustrating an MPEG transcoder processor according to at least one embodiment of the present invention.

Referring now to FIG. 1, a high level functional block diagram of a video processing system is illustrated according to at least one embodiment of the present invention. Video processing system 100 includes input buffer 105 to receive data representing a video image to be provided to MPEG decoder 110. MPEG decoder 110 creates either the video image or an optionally scaled down representation of the video image decompressed frames in memory (RAM1 120). Additionally, MPEG decoder 110 can obtain the motion vectors from the decompression process. The motion vectors are saved in memory (RAM2 140). Note that the motion vectors are not normally saved in memory using a standard MPEG decoder. Also note that in other embodiments, memories 120 and 140 can include dynamic random access memory, static dynamic random access memories, hard drive storage devices, and the like.

MPEG encoder 150, in one embodiment, performs many of the steps of normal MPEG encoding, but avoids the computationally intensive motion estimation step by retrieving the motion vectors previously saved in RAM2 140. By retrieving the set of surrounding motion vectors and building a new set of motion vectors, MPEG encoder 150 can avoid the expensive search that is required in conventional motion estimation. Output buffer 160 includes a bit bucket that accumulates data bits before it out to a final destination, such as memory or any output ports to a device coupled to receive such data.

Figure 2:
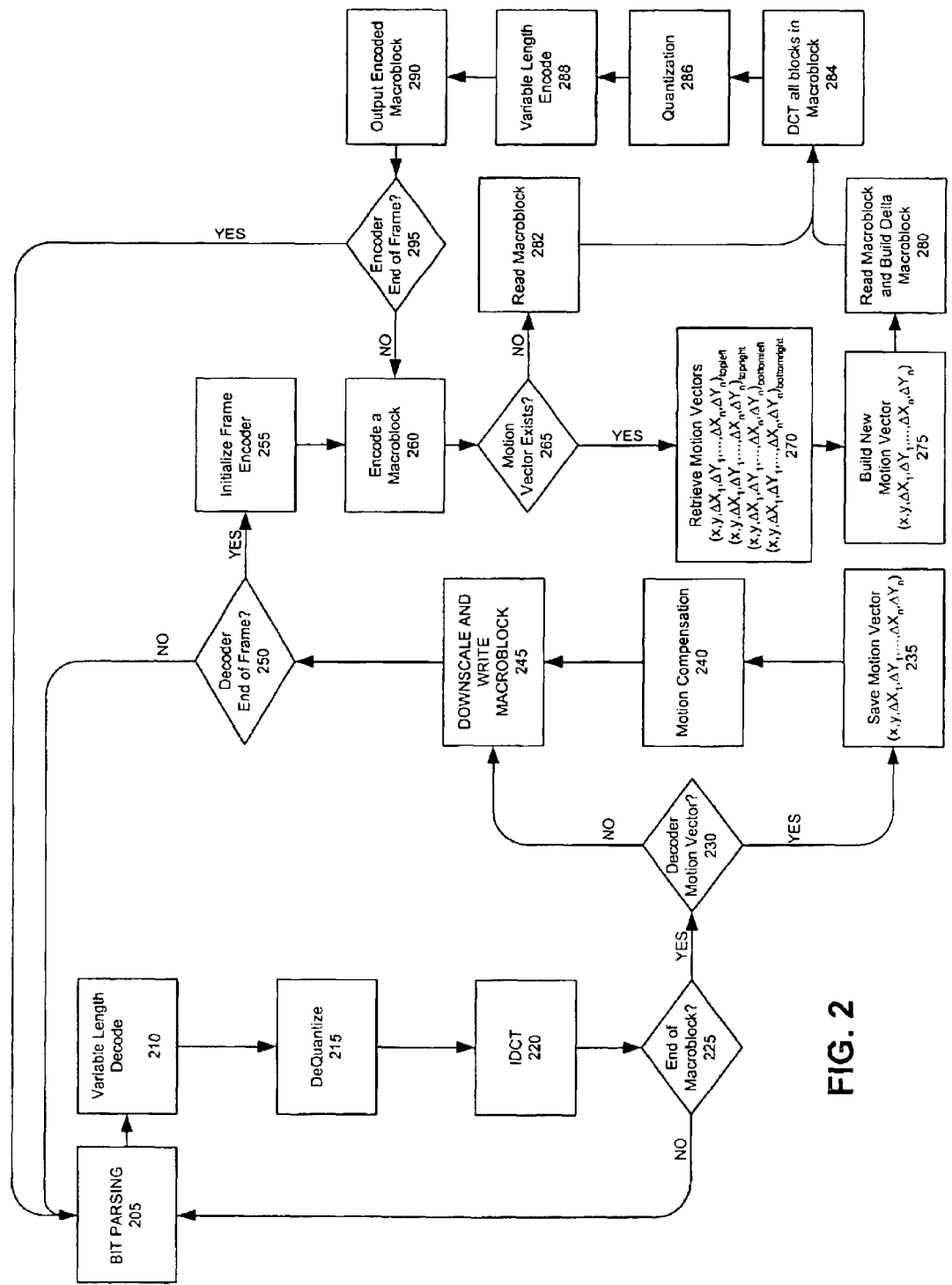
FIG. 2 is a flow diagram illustrating an operation of a MPEG transcoder processor according to at least one embodiment of the present invention.

Referring to FIG. 2, a transcoding method is illustrated according to at least one embodiment of the present invention. With reference to the specific embodiment illustrated in FIG. 2, elements with labels from 205–250 indicate functions the decoder portion, and elements 255–295 identify functions encoder portion of the transcoder. Note that this example assumes an image downscale of ½×½. A macroblock, in MPEG terminology, is a 16×16 matrix of individual picture elements. A block in MPEG terminology is an 8×8 matrix of individual picture elements. When downscaling by ½×½, it is assumed that a 2×2 set macroblocks are converted to form a single macroblock. The ½×½ downscaling operation is typically performed with an effort to preserve as much content of the original image as possible, while presenting the final result in a smaller bitmap. Downscaling is well understood to mean a process where a group of picture elements are combined in some fashion to create another group consisting of less picture elements. For downscaling of ½×½ several options are available. For example, one possible implementation, the picture elements are blended in a predefined method. However, one reasonably versed in the art will understand that there are multiple ways to blend them to achieve the same results or perhaps to even scale without blending.

In step 205, a macroblock being decoded is retrieved and bit parsed. In step 210, a variable length decode, using a Huffman decoder for example, is performed, and can be run level or run length decoding, to retrieve information about a particular block. The information retrieved contains a series of run-level sequences, each representing an 8×8 spare matrix (known as a block) with a run of sequential zero values implicitly defined by the run. When referred to as run-level within the MPEG scope, the run refers not to repeated runs of the value in level, but to consecutive runs of 0. In the case of MPEG, the block is built in a zigzag fashion.

After the decode, the process dequantizes the generated block in step 215, which involves multiplying each element in the block with an element in a matrix. As is well known in the art, dequantization is inverse quantization, where a matrix of fixed constants might be retrieved or determined at the start of the decoding process, rarely changing as the stream is decoded. Each element of the sparse matrix is multiplied with this constant value from the corresponding entry in this matrix of constants. To understand the significance of the inverse quantization process, it should be understood first that during the compression process, the blocks, in one embodiment, went through a discrete cosine transform (DCT) step to convert the picture blocks into the frequency domain. In this representation of the picture blocks, the original blocks can still be retrieved (up to arithmetic rounding resulting from limitations in number representation) without any loss.

In the frequency domain, the block of data has an interesting property. The main determinants of the appearance of the image to the human eye is primarily decided by the terms of the block (matrix) that are in the top left corner (starting at indices [0,0,] of the matrix). Changes to the terms to the bottom right of the block tend to have less of a visible effect on the reconstructed blocks to the human eye. The purpose of quantization during the encoding process is to take advantage of this property and attempt to treat terms that are close to zero and positioned closer to the bottom right, as zero, while preserving as much of the information in the top left corner as possible.

After the block has been dequantized, an inverse discrete cosine transform (IDCT) method is applied to the block of data in step 220 to obtain the block in its raw form. Steps 205–220 proceed via a loop through the end of macroblock decision step 225, until a complete macroblock is obtained. For MPEG, this macroblock typically consists of 4 (2×2) blocks of information in the Y (luma, or brightness) and 1 block of Cr and 1 block of Cb. When the complete macroblock is obtained, the process proceeds to test decoder motion vector step 230, where motion vectors for the macroblock are determined or identified. If there is no motion vector for a particular macroblock, in one embodiment, the macroblock is downscaled by a scale factor, such as 1, 2, 4 or 8, and written out in step 245.

Where there is a set of motion vectors, the motion vectors will be saved in step 235 into a storage area, such as memory 140 (FIG. 1), that holds all the original motion vectors used to build this frame. In step 240, motion compensation is performed to build a new macroblock. This new macroblock is then downscaled and output in step 245.

In step 250, if the frame has finished, the process initializes the frame encoder, at 255, which will start to encode a macroblock in step 260. If the current macroblock has no motion vectors (determined at step 265), then the macroblock is read in step 282, from the downscaled and decompressed frame created during the decoding process, and each block in the macroblock undergoes a discrete cosine transform in step 284. If the current macroblock has motion vectors (determined in step 265), the four sets of neighboring motion vectors are retrieved from storage in step 270 and are used to build the original image frame in steps 275 and 280. In this example, note that scaling of ½×½, is used. Retrieval of more motion vectors for other scale factors would be required. For example, if scaling by ⅓×⅓, 9 motion vectors would be used. If scaling is by ⅖×⅖, between 4 to 9 motion vectors would be used, depending on how the resultant motion vector is generated.

In step 275, the new motion vector can be built in multiple ways. In one method, a simple averaging modulo of ½ can be applied to each component of the vectors from each of the four sets of motion vectors. In an alternate embodiment, the most frequently occurring motion vector ($\Delta X_k$, $\Delta Y_k$) from each set of kth-motion vectors can be selected, with an arbitrary method for breaking ties. One possible method of breaking ties is to choose the element that is closest to the top left motion vector.

With the new motion vector built in step 275, the process proceeds to read the macroblock from the stored decompressed image frame and then builds a delta frame containing the result of applying a reverse motion compensation step to obtain the delta macroblock in step 280. At this point, the delta macroblock is sent to the unit that performs a discrete cosine transform (DCT) on all in step 286 (rounding integer division of each element by elements of a matrix). The resulting quantized matrix representation of each block is then variable length encoded in step 288, and the compressed result is sent to the output encoded macroblock unit in step 290. This process continues until detecting the encoder end of frame in step 295, signaling the decoder to begin working on the next frame. Note that with use of double buffering of the motion vectors, and queuing other command streams, both the encoder and decoder steps may both run in parallel.

One feature of at least one embodiment is that, where there are motion vectors, the motion vectors will be saved in step 235, into a storage area that holds all the original motion vectors used to build the processed frame. In addition, the computation intensive and costly motion estimation step is avoided by retrieving the stored motion vectors and building a new motion vector set using simple process steps in step 275. By avoiding the expensive motion estimation step, the present invention may provide a much more cost-effective solution that achieves largely the same quality of transcoding as systems that searches the motion vectors from scratch.

Figure 3:
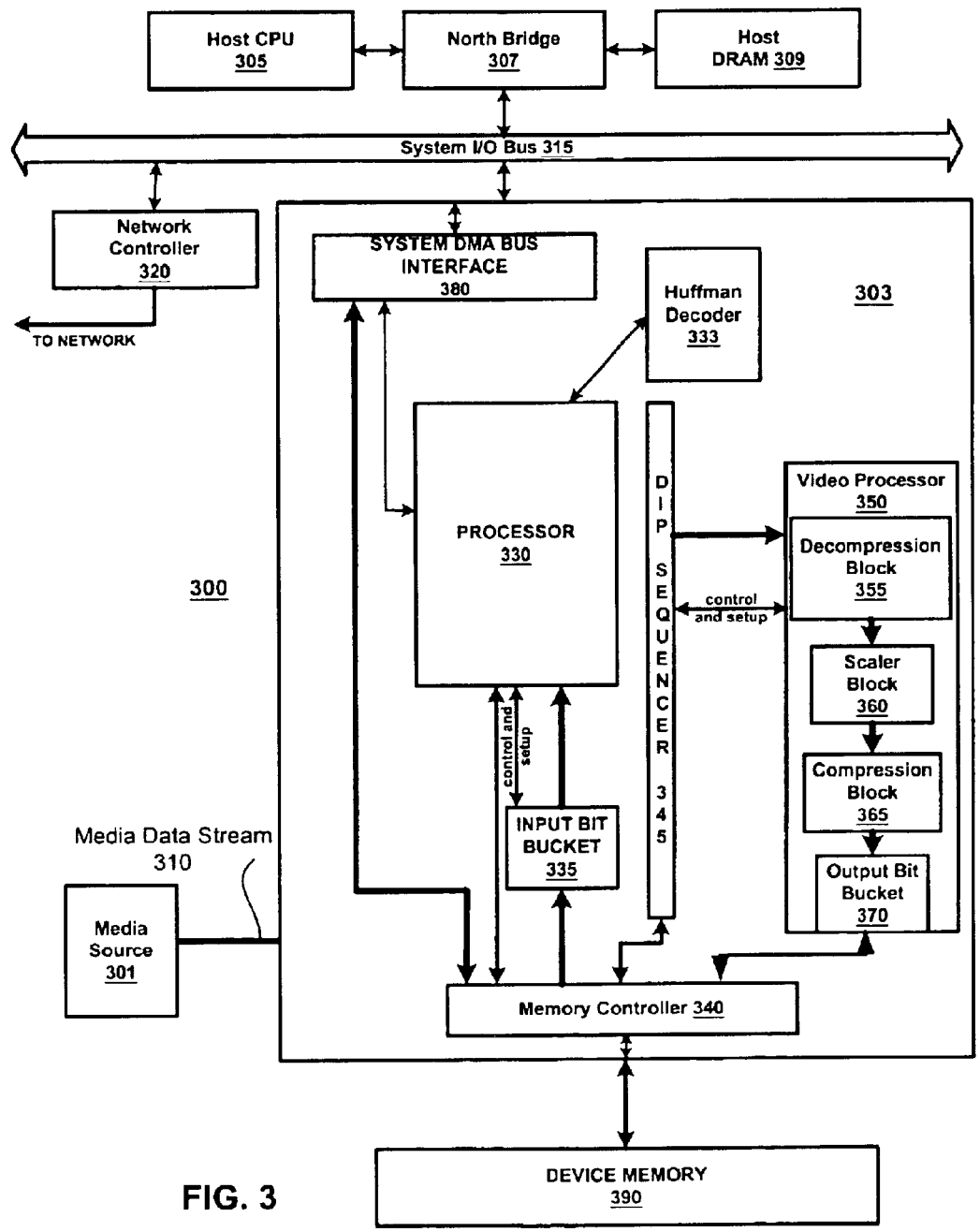
FIG. 3 is a block diagram illustrating a compressed video transcoding system according to at least one embodiment of the present invention.

Referring next to FIG. 3, a compressed video transcoding system is illustrated according to another embodiment of the present invention. Compressed video transcoding system 300, herein a referred to as transcoding system 300, can include part all or none of video processing system 100 (FIG. 1) in various implementations. Transcoding system 300 includes media source 301, transcoder device 303, host central processing unit (CPU) 305, a bus/memory controller 307 (i.e. a north bridge chip), host dynamic random access memory (DRAM) 309, system input/output (I/O) bus 315, network controller 320, and device memory 390.

Transcoder device 303, in one embodiment, includes processor 330, Huffman decoder 333, input bit bucket 335, memory controller 340, decoder instruction packet (DIP) sequencer 345, video processor 350, and system direct memory access (DMA) bus interface 380. In at least one embodiment, processor 330 is a general purpose processor, such as a RISC processor, while DIP sequencer 345, and video processor 350 are specialized data processors optimized to handle specific tasks efficiently. In one embodiment, the video processor 350, sequencer 345, and processor 330 are integrated on to a common substrate, such as a semiconductor substrate or a package substrate. Transcoding system 300 can include additional elements, as appropriate, without departing from the spirit or the scope of the present disclosure.

In at least one embodiment, media data stream 310 represents digital media data from one or more sources 301, each source can have one or more media data channels. Media source 301 can include any source of media data streams, such as a MPEG player, a data server connected to transcoding system 300 via network controller 320, and the like. In one embodiment, media data stream 310 is in a byte, or word format when received at he system 303. In other embodiments, the media data stream 310 can be a bit stream that is organized into bytes or an appropriate word size by the system 330. Once in an appropriate word format, the data is transmitted to memory controller 340. In one embodiment, the media data stream 310 is treated as a client of the memory controller 340. The media data stream can be provided to the memory controller 340 through a shared or dedicated set of input pins, or through the system I/O bus 315. Generally, the memory controller 340 will arbitrate among each of its clients based on a predefined prioritization scheme, such as a round robin scheme, or based on a fixed prioritization as will be discussed greater with reference to FIG. 5.

The data from media data stream 310 is stored in device memory 390. Device memory 390 can include flash memory, random access memory, a cache, and the like. Once data streams are stored in the device 390, a plurality of clients, including the processor 330 and video processor 350, can access the memory 390 through controller 340 and access the data streams from memory 390. This allows the system 303 to process data in parallel.

Processor 330, in one embodiment, uses input bit bucket 335 as a staging area to support bit-level accesses to the data stored in the memory 390, and to buffer data thereby reducing latency between the processor 330 and the data stored in the memory 390. For example, the processor 330 may request any bit or multiples of bits in a variable range by using the input bit bucket 335. For example, the processor can request a byte, or appropriate size word, starting at bit 3 of an address location. The returned value will have the value of bit 3 appropriately aligned to a boundary of the actual data provided to the processor 330.

Processor 330, in one embodiment, is a general purpose processor, such as a MIPs processor, or a specialized processor, such as an ASIC. A general purpose processor is a data processor that performs one or more functions specified by software, where it is understood that software would include firmware. In one embodiment, processor 330 access received video data and performs error correction; filtering, such as parsing or decoding of the media data stream 310 generates decoder instruction packets (DIPs) for a desired media data channel received through media data stream 310. The DIPs include specific instructions and/or control information to be used by the DIP sequencer 220 and vector processor 230 to generate new macro blocks. Once generated, the DIPs can be stored in device memory 390 by memory controller 340. In another embodiment, one or more of the error correction, filtering, or parsing functions are performed by another component of device 303. For example, a bit stream filter (not shown) could be used to perform filtering operations on media data stream 310 before it is stored in device memory 390 by memory controller 340. Processor 330 can also utilize a dedicated Huffman decoder 333 to perform a Huffman decoding process. Huffman decoder 333 can include a simple variable bit lookup table in hardware or software that speeds up the decoding process.

DIP sequencer 345 acts as a control unit to the video processor 350. In fact, the DIP sequencer can be considered part of the video processor 350. The sequencer 345 is a client to the memory controller 340 from which receives data and provides the data to the video processor (transcoder) 350 along with control signals.

Video processor 350, in one embodiment, is a video transcoder that receives the DIPs and control signals from the DIP sequencer 345 and then proceeds to perform media decoding in a pipelined fashion to maximize throughput. In at least one embodiment, video processor 350 uses id decompression block 355 to decompress the DIPs. The data output of decompression block 355 is transmitted to scalar block 360, where the decompressed video data is scaled by a scale factor and then output to compression block 365. Compression block 365, in one embodiment, compresses the output of scalar block 360 to generate a compressed data, such as a video frame, and transmits the compressed data to output bit bucket 370, which stores bits of compressed video data until an entire word is ready to be stored by the memory controller 340. A particular implementation of video processor 350 is discussed in greater detail with reference to FIG. 4.

Memory controller 340 treats video processor 350 as a client and retrieves its data from output bit bucket 370 and stores it in device memory 390. Once a frame of compressed media is retrieved from the video processor 350 and stored in the memory 390, it can be accessed by system DMA bus interface 380 and sent to north bridge 307 using system I/O bus 315. North bridge 307, in turn, routes the data to host DRAM 309. Host DRAM 309, in one embodiment, serves as storage for the final media data channel to be distributed to the rest of the system. In one embodiment, host processor 305 schedules when the final media data channel will be sent to network controller 320, which handles the distribution and broadcast of the final media data channel. In one embodiment, the network controller is connected to a plurality of display devices used to display transmitted information. Note that the north bridge 307 represents an integrated or multi-chip solution for interfacing the host CPU 305 to the system (host) memory 309 and the IO bus 315.

Figure 4:
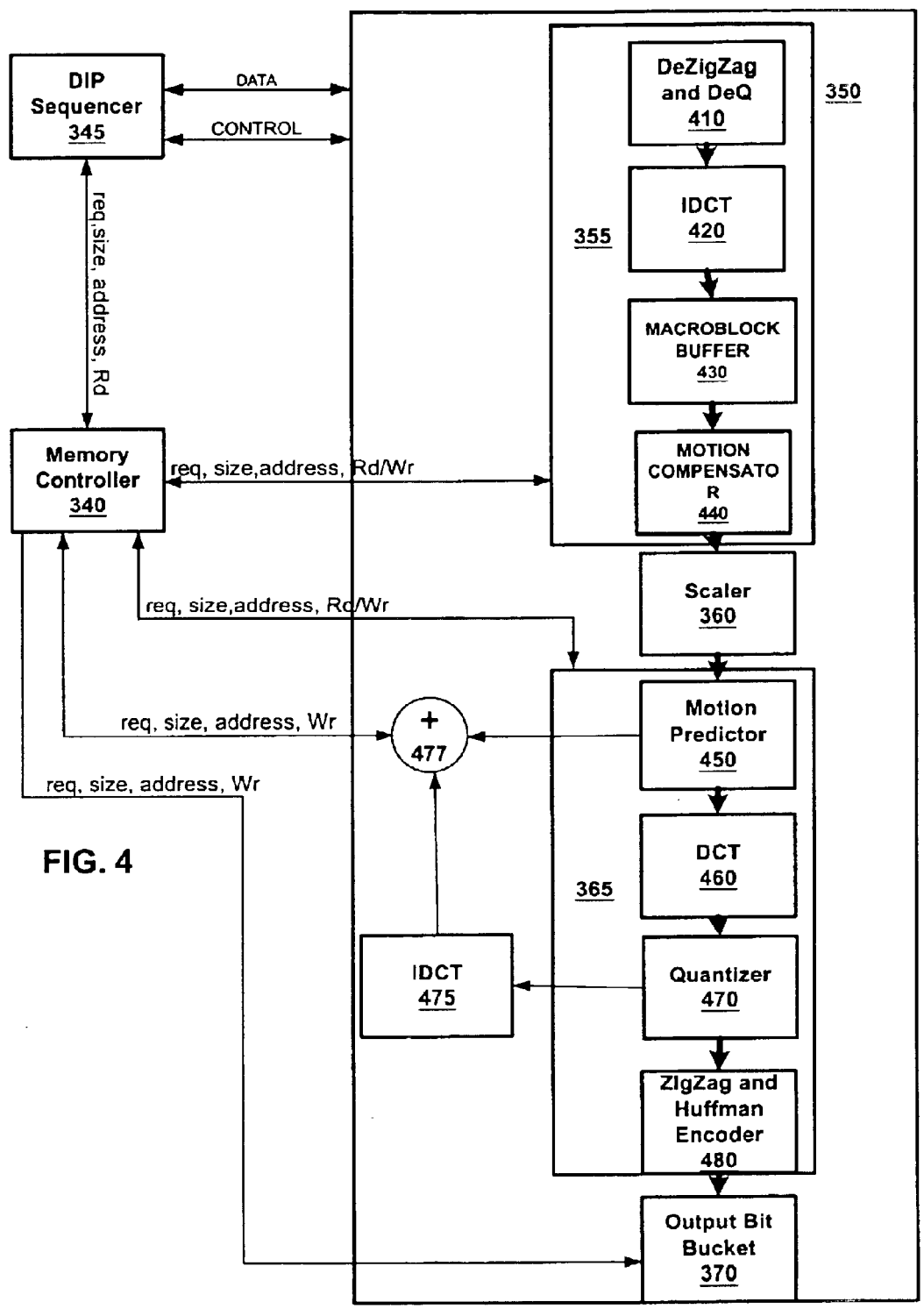
FIG. 4 is a block diagram illustrating a vector processor according to at least one embodiment of the present invention.

Referring now to FIG. 4, a particular implementation of video processor 350 is illustrated according to at least one embodiment of the present invention. Recall that video processor 350 decompresses a media data channel (in the form of DIPs) parsed from media data stream 310 using decompression block 355, scales the output using scalar block 360, and then compresses the scaled output using compressor block 365. In one implementation of the present invention, decompression block 355 includes deZigZag/dequantizer block 410, inverse discrete cosine transform (IDCT) block 420, motion compensation 430, and macroblock buffer 440, while compression block 365 includes buffered motion predictor block 450, discrete cosine transform (DCT) block 460, quantizer/ZigZag block 470, and Huffman encoder 480. It will be appreciated that one or more components of decompression block 355 and/or compression block 365 may be implemented separately.

As discussed previously, in one embodiment, the decoder instruction packets (DIPs) are retrieved from device memory 390 (FIG. 3) by DIP sequencer 345 through the Memory controller 240. In this case, DIP sequencer 345 can then forward the DIPs to the transcoder 350 in a manner operable to provide the DIPs to an appropriate location. For example, the sequencer 345 can provide data to individual blocks by directly addressing and providing data through a bus local to the transcoder 350, or the sequencer 345 can write control land and/or data information to a register backbone that is accessible by the transcoder 350 blocks. During a normal data flow, the sequencer will enable the deZigZag/dequantizer block 410 to retrieve data.

In one embodiment, the DIP Sequencer retrieves DIPs based on elementary stream data received over media data stream 310 and stored in memory 390. Recall that, in at least one embodiment, media data stream 310 (FIG. 3) includes one or more MPEG video data channels. In this case, the MPEG algorithm for compression of the video channel has usually a stage in the algorithm for a discrete cosine transform (DCT), which performs a time domain to frequency domain transform As a result of this transformation, the elements in the frequency domain, post-DCT, that are closest to the top left element of the resulting matrix with indices (0,0) are weighted more heavily compared to elements at the bottom right of the matrix. If the matrix in the frequency domain were to use less precision to represent the elements in the lower right half of the matrix of elements, the smaller values in the lower right half will get converted to zero if they are below a threshold based on a quantization factor. Dividing each element by a quantization factor is one method utilized to produce more zero elements. MPEG and related algorithms often apply larger quantization values to decrease the precision of the matrices in the frequency domain, resulting in more zero elements, and hence decrease the data transmission rate. Accordingly, in one embodiment, deZigZag/dequantizer block 410 dequantizes the results of a DCT operation on media data channel.

Similarly, although the normal way to represent a matrix is in a (row, column) format, the distinct properties of a matrix produced as a result of a DCT function lend themselves to a different method of representing the post-DCT matrix. In one embodiment, the post-DCT matrix is represented in a zigzag manner, e.g. (1,1), (2,1), (1,2), (1,3), (2,2), (3,1), (4,1), (3,2), (2,3), etc. By representing the post-DCT matrix in this manner, a relatively long run of zeros in the post-DCT matrix is likely to be encountered. As a result, the post-DCT matrix can be more efficiently represented by using a (Run, Level) format, where Run represents the number of consecutive zeros and Level represents the value of the next non-zero element of the post-DCT matrix. The (Run, Level) pair can then be encoded via a fixed Huffman table to further compress the post-DCT matrix.

The output from deZigZag/dequantizer block 410, in one embodiment, is sent, or otherwise made available, to a component that converts the output from a frequency domain to a time domain. For example, if the parsed channel of media data stream 310 (represented by DIPs) was previously processed according to a discrete cosine transform, the output from deZigZag/dequantizer block 410 could be sent to inverse discrete cosine transform (IDCT) block 420 where the output is converted from a frequency domain to a time domain using an inverse discrete cosine transform function to generate a block of data. Other methods for conversion between a frequency domain and a time domain may be used without departing from the spirit or the scope of the present invention. The blocks generated by IDCT block 420 can be stored in macroblock buffer 430. When enough blocks are generated to form a macroblock, macroblock buffer 430 will send the macroblock of data down along with motion vector information to motion compensator 440.

In one embodiment, motion compensator 440 can operate as discussed previously with reference to step 240 of FIG. 2, where motion compensator 440 stores motion vectors for later use. In an alternate embodiment, the motion vectors need not be stored. If the macroblock transmitted to motion compensator 440 is part of a reference frame (I-Frame), motion compensator 440 decodes the macroblock and writes the decoded results to device memory 390 (FIG. 3) using memory controller 340. The reference frames generally are used to decode other non-reference frames that have to be constructed from the motion vectors.

The new macroblock generated by motion compensator 440, in one embodiment, is sent to scalar block 360, where the macroblock is scaled using a scale factor. For example, if the macroblock includes a 4×4 matrix of blocks and a scale factor of 2 is used, the resulting scaled macroblock would include a 2×2 matrix of blocks. The resulting scaled macroblock is then transmitted to buffered motion predictor 450 to begin the compression process.

In one embodiment, when enough scaled macroblocks are generated to form a new complete macroblock, the associated stored motion vectors are processed by a motion vector generator, such as buffered motion predictor 440, to generate a new set of motion vectors. In an alternate embodiment, motion vectors can be generated based upon the macroblocks of adjacent frames in a traditional manner.

Reference frames are passed to DCT 460 a block at a time. DCT 460 takes each block and transforms the block of data from a time domain into a frequency domain, for example by performing a discrete cosine transform, as discussed previously. In one embodiment, if the macroblock does not have any motion vectors associated with it, such as an intraframe or I-frame, the macroblock is passed directly from scalar 360 to DCT block 460, for example using an internal data path, without being processed by motion predictor 450.

The modified block output by DCT 460, in one embodiment is sent to quantizer/Zigzag block 470, where the block is quantized and/or transformed, or "zigzagged" from a (row, column) format to a format more optimized for run level encoding. The quantized and/or zigzagged output from quantizer/ZigZag block 470 can then be sent to Huffman encoder 480, which compacts or compresses the output from quantizer/ZigZag block 470 and sends the results of the compression as a bit stream to output bit bucket 370. In one embodiment, output bit bucket is capable of storing data in a bit level manner at any bit location with a low latency. For example, the output bit bucket can operate as a buffer to accumulate the bit stream output from Huffman encoder 480 so that it can be written to device memory 390 in an efficient manner.

The transcoder 350 further includes an IDCT portion 475 which performs an IDCT on the data from the quantizer. This data is combined with data from the motion predictor 450 and stored to correct for the effects of lossy compression. In some embodiments, correction for lossy compression is used, as the frames generated by the transcoder can be used as reference frames to form other frames. The propagation of errors can be limited by providing for a step to correct for lossy compression, thereby improving the accuracy of the data generated by the encoder portion.

Figure 5:
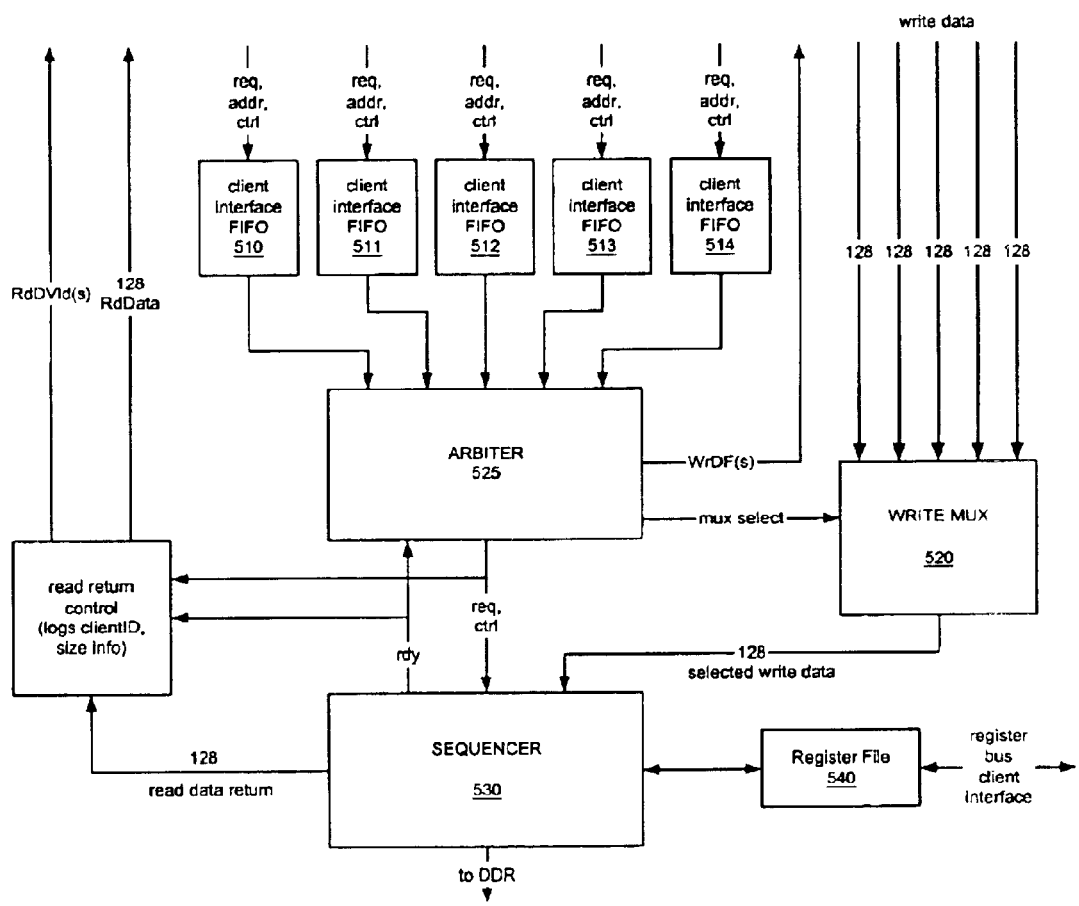
FIG. 5 is a flow diagram illustrating an operation of a compressed video transcoding processor according to at least one embodiment of the present invention.

FIG. 5 illustrates a specific embodiment of memory controller 340. Specifically, FIG. 5 illustrates a memory controller having a plurality of client interface FIFOs 510–514 (First In First Out memories) for receiving requests from specific client. The client interface FIFOs each receive requests for data access from a specific client. In the embodiment illustrated, write data is received at a plurality of write data busses at a multiplexer 520. The arbiter 525 determines which pending write request is to be serviced, and provides appropriate control signals to receive the corresponding input channel. A memory sequencer 530 organizes the read requests in an efficient manner. For example, once a page of memory is open, the sequencer will generally attempt to service requests from the same page to reduce the latency overhead. In addition to interfacing with memory, such as dual data rate (DDR) memories, the sequencer can have access to a register file which interfaces with a register bus client interface. A read data return path provides accessed data to the read return control portion 535. The read return control portion 535 interfaces to a read data bus to return information to one of the plurality of clients.

Figure 6:
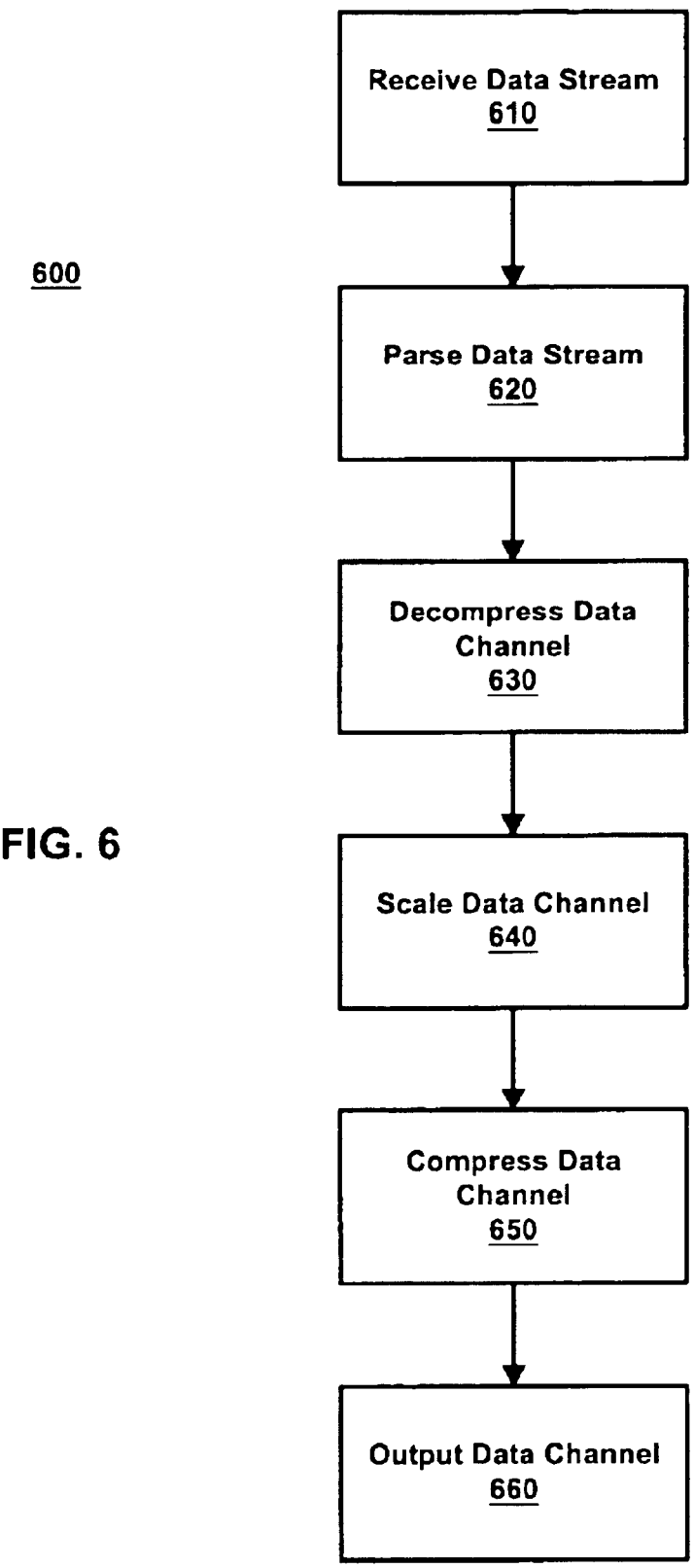
FIG. 6 illustrates a method for using a transcoding system as disclosed in at least one embodiment of the present invention.

Referring to FIG. 6, a method for using transcoding system 300 is discussed according to at least one embodiment of the present invention. Transcoding method 600 initiates with step 610, where media data stream 310 (FIG. 3) is received by, or transmitted to, transcoder device 303. As discussed previously, media data stream 310 can be stored in device memory 390 (FIG. 3) for later retrieval. In step 620, processor 330 parses media data stream 310 to identify a desired data channel, such as a video data channel sent from a MPEG player. Processor 330 can also perform other processes on media data stream 310 in step 620, such as error correction, filtering, etc.

In step 630, the parsed data channel, in one embodiment, is transmitted to video processor 350 in the form of decoder instruction packets (DIPs). Decompression block 355 of video processor 350 decompresses the DIPs, as discussed previously with reference to FIG. 4. In step 640, the output of decompression block 355 is scaled by scalar block 360 (FIG. 3) using a scale factor to reduce the amount of data associated with an element of the desired channel of media data stream 310. For example, by scaling a macroblock of a MPEG video channel, less data is needed to represent each frame. In step 650, the scaled data output from scalar block 360 is compressed by compression block 365, as discussed previously with reference to FIG. 4. The compressed output from compression block 365 is then output to one or more receiver units. The receiver units could include a variety of media devices, such as video display terminals, audio devices, and the like.

As a result of the procession performed by transcoding system 300, a channel of media data stream 310 (FIG. 1) is downscaled or compressed, resulting less data associated with the channel. For example, video processor 350 (FIG. 3) could downscale a channel of a video data stream (media data stream 310) from a MPEG player, resulting in a channel having less data per frame. This downscaling would then allow the video data channel to be transmitted faster and/or more efficiently over a network or other medium. For example, in one embodiment, media data stream 310 includes a plurality of video data channels to be used for real-time playback. In this case, by individually downscaling one or more of the video data channels, they may be transmitted more quickly and/or more efficiently, thereby supporting the real-time playback of the video channels.

The particular embodiments disclosed herein are susceptible to various modifications and alternative forms. Specific embodiments therefore have been shown by way of example in the drawings and detailed description. It should be understood, however, that the drawings and detailed description are not intended to limit the invention to the particular form disclosed, but on the contrary, to the maximum extent permitted by law, the invention is to cover all modifications, equivalents and alternatives falling within the spirit and scope of the present invention as defined by the following claims, and their equivalents. For example, in the system illustrated in FIG. 1, the connections between the decoder 110 and the memories 120 and 140 may represent separate busses or common busses. Likewise, the connection between the encoder 150 and the output buffer and the connection between the decoder and the input buffer may represent the same or different connections, and may even be common with the connections to the memories 120 and 140. Also, in another embodiment of the present invention, one of a normal mode of operation, where the encoder determines the motion vectors, and a motion vector reuse mode as described herein is selected. Selection of one mode will generally be based on the availability of previously saved motion vectors. Note that in another embodiment, during a normal mode of operation, the decoder would not save motion vectors.

One implementation of the invention is as sets of computer readable instructions resident in the random access memory of one or more processing systems configured generally as described in the FIGS. Until required by the processing system, the set of instructions may be stored in another computer readable memory, for example, in a hard disk drive or in a removable memory such as an optical disk for eventual use in a CD drive or DVD drive or a floppy disk for eventual use in a floppy disk drive. Further, the set of instructions can be stored in the memory of another image processing system and transmitted over a local area network or a wide area network, such as the Internet, where the transmitted signal could be a signal propagated through a medium such as an ISDN line, or the signal may be propagated through an air medium and received by a local satellite to be transferred to the processing system. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information.

Figure 7:
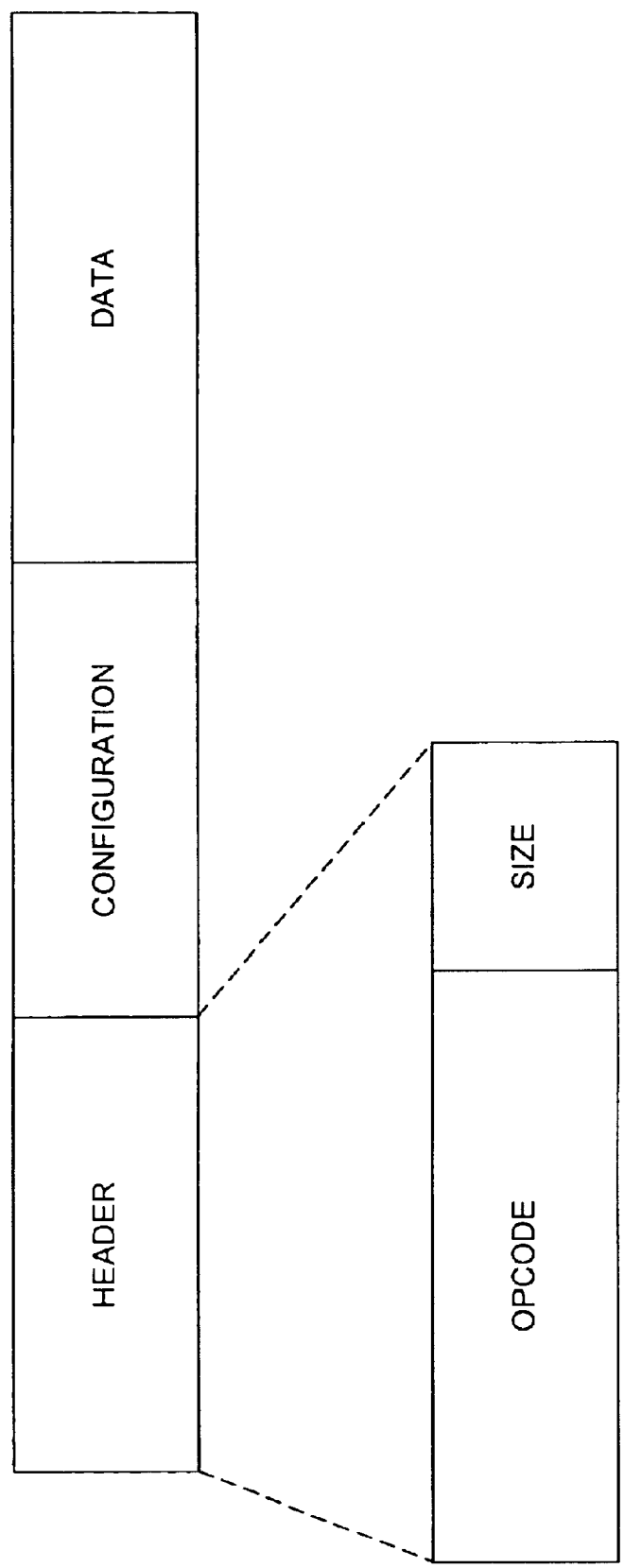
FIG. 7 illustrates a data instruction packet in accordance with one embodiment of the present invention.

A data instruction packet (DIP or "DIP packet") is a data packet that can contain both instruction information and data. FIG. 7 illustrates one example of a DIP packet.

The DIP illustrated in FIG. 7 has a header portion, a configuration portion, and a data portion. The header of the DIP comprises an opcode and a size indicator. The opcode portion of the DIP indicates an instruction, or other control information to be associated with a specific DIP packet. In one embodiment, the size portion of the header indicates whether there is a size payload associated with the DIP. For example, the size portion can have a value to indicate that there is no configuration or data associated with the DIP, only the size of the header. Another embodiment allows a size portion value to indicate the DIP is terminated by an end of DIP (EOD) indicator. Another embodiment allows a size portion value to indicate that the size of the DIP is specified a subsequent number of bytes. For example, the size portion value can indicate that the next two or four bytes contains an unsigned integer specifying size of the DIP.

The configuration portion of the DIP can contain configuration information specifically related to its specific opcode. For example, a DIP could have an opcode to indicate picture control information is included, whereby the configuration portion can be predefined such that a DIP decoder would access the control information from the configuration portion at a predefined location(s): Note that the configuration portion of the DIP is optional depending upon the actual DIP. Also, the configuration portion can contain the size payload data described above.

The data portion of the instruction packet can contain data associated with the DIP packet. For example, compressed or uncompressed video data could be included as part of a specific DIP. Note the presence of data portion is based upon the opcode. In a mode where no configuration or data portion is available, the header portion can specify a specific operation to be performed independent of configuration and operation data.

In accordance with a specific mode of the disclosure, the DIP packets are used to packetize digital video data, such as elementary stream data, in such a manner that the video data is independent of the type of data from which it is received. Therefore, if a specific video standard, such as the MPEG standard, changes in the future, or if a different digital video standard is desired to be supported, the procedure used to generate the DIPS could change to accommodate the received video data while leaving the DIP format unchanged. This provides for efficiency in that hardware can be designed independent of specific video standards.

Examples of specific DIP opcodes include a DIP opcode indicating the DIP contains video time stamp information, a DIP opcode indicating that picture configuration information is contained within the DIP, a DIP opcode indicating slice or macro block information is included with the DIP, a DIP opcode indicating scaled motion vector information is included in the DIP, a DIP opcode indicating that quantizer matrix data is included in the DIP, a DIP opcode indicating that the last picture DIP should be repeated, and/or a DIP opcode indicating a specific picture location, such as end of a slice, frame, or macroblock. It will be understood that additional opcodes can be included to support other functions, and that the actual DIP containing the opcode is generally stored and subsequently decoded.

Figure 8:
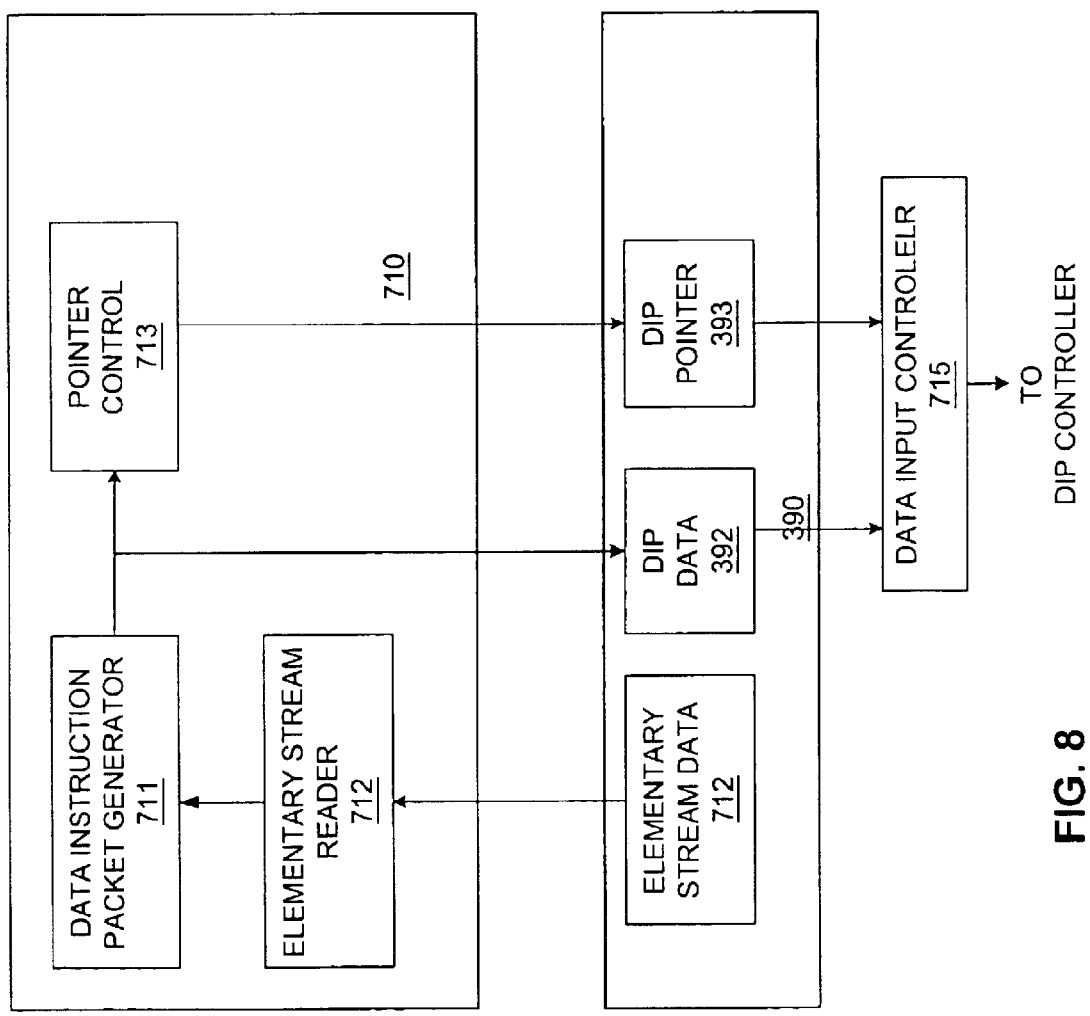
FIG. 8 illustrates a portion of FIG. 3 in greater detail.

FIG. 8 illustrates in block diagram form, a portion of the system 300 (FIG. 3) used to generate DIP packets. FIG. 8 includes a DIP generator portion 710, which in one embodiment can correspond to a portion of the processor 330 of FIG. 3; the memory device 390; and a data input by controller 715, which in one embodiment corresponds to a portion of the DIP sequencer 345. It will be appreciated that in alternate embodiments that the components illustrated can be implemented using other hardware or software solutions from those illustrated.

DIP generator 710 includes an elementary stream reader 712, a data instruction packet generator 711, and a pointer control portion 713. In one embodiment, each of the elements 711–713 can be implemented in software on a general purpose processor having a combination of input and output ports for providing the data to and from the individual software modules. In another embodiment, the elements 711–713 can be implemented in hardware having input and output ports coupling components to one another.

Memory 390 includes portions to store elementary stream data 391, DIP data 392, and DIP pointer data 393.

In operation, the elementary stream reader 712 receives elementary stream data, or other video data, from memory portion 391. In one embodiment, the elementary stream data 391 has first been received from a media source 301, as illustrated in FIG. 3, and stored in portion 391. Generally, this data will be stored as elementary stream data representing a video image. As discussed with reference to FIG. 3, the data can be received as the result of a client request to a memory controller. The elementary stream reader receives the video data so that it may be packetized by the data instruction packet generator 711. The data instruction packet generator generates the actual DIP that includes the instructions and data necessary for subsequent control and operation of the video processor portion 350, of FIG. 3.

In addition to packetizing video data for use by the video processor 350, the data instruction packet generator can generate DIPS to configure the video processor 350. In one embodiment, each macro block of data is stored as a single DIP. In other embodiments a plurality of macroblocks can be associated with a single DIP. For example, an entire slice of data can be transmitted as part of a single DIP. Likewise, it will be appreciated that any number of DIP variations can be implemented to transmit video information.

As a specific DIP is generated by the data instruction packet generator 711 it is written back to a DIP storage portion 392 which may be part of memory 390. It will be appreciated that the DIP storage portion 392 can be volatile memory, or non-volatile memory, such as a hard drive. In one embodiment, the DIP storage portion 392 can be a circular buffer associated with a frame buffer that is accessed by the video processor. Generally, the access of elementary stream data by elementary stream reader 712 and the generation of DIPs occurs in real time relative to the viewing of the image being generated. Once the DIP data is stored in the memory location 392, the data input controller 715 can receive the DIP data to provide it to a DIP decoder, as will be discussed later.

In accordance with a specific embodiment of the invention, a pointer control portion 713 tracks when a new DIP is generated and stores a pointer to the DIP in a storage location 393. Uses of the DIP pointer data will be discussed in greater detail herein.

Figure 9:
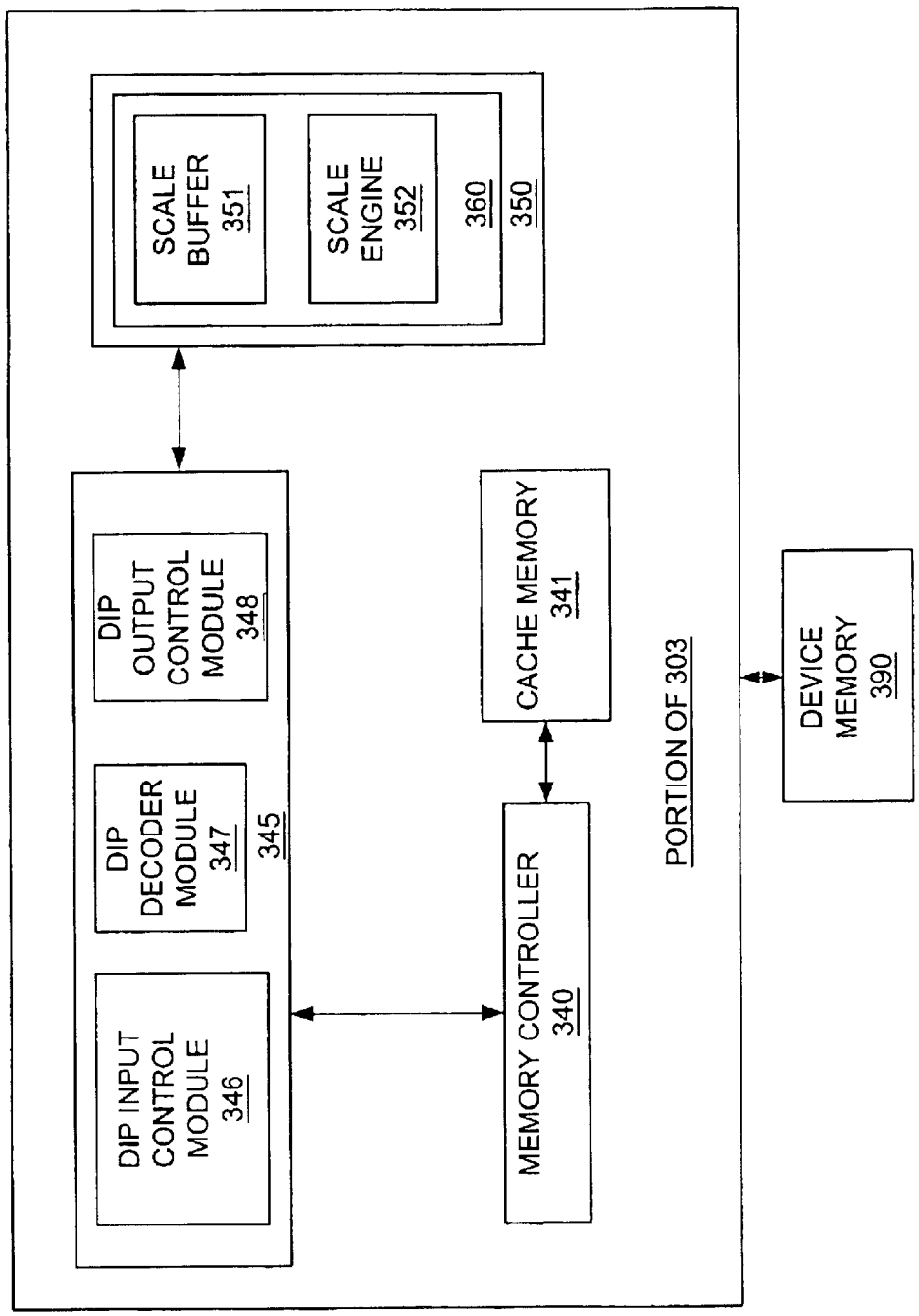
FIG. 9 illustrates a portion of FIG. 3 in greater detail.

FIG. 9 illustrates in greater detail a portion of the device 303 (FIG. 3) and the device memory 390. Specifically, FIG. 9 illustrates memory controller 340, DIP sequencer 345, video processor 350, and a cache memory 341. The DIP sequencer illustrated in FIG. 9 further comprises a DIP input control module 346, which can correspond to the data input controller 715 of FIG. 8, a DIP decoder module 747, and a DIP output control module 348. The DIP sequencer is coupled to the video processor 350.

The video processor 350 includes additional detail relative to its scalar block 360. Specifically the scalar block 360 further comprises scale buffer 351 and scale engine 352. The DIP sequencer 345 is coupled to the memory controller 340 which in turn is coupled to one or more memory devices such as the device memory 390. Note a cache memory 341 is illustrated that can include data stored in memory 390.

In operation, the input control module 346 of the DIP sequencer 345 will receive specific DIP information through the memory controller 340. In one embodiment, the DIP input control module submits client read requests to the memory controller 340. The memory controller 340 will receive DIPs either through cache memory 341, or device memory 390. Upon receiving the requested DIP, the decoder 347 will perform an operation based on the opcode portion of the DIP packet. In one embodiment, the DIP decoder module 347 will include microcode associated with each one of the DIP opcodes. Based on the specific opcode, the DIP sequencer 345 will interface with the video processor portion 350 through the DIP output control module 348.

For example, if the opcode in a specific DIP indicates picture configuration data is included, the DIP decoder module 347 will execute a function, in hardware or software, that would write to appropriate registers of the video processor 350 to configure it with specific information. For example, specific scale information, such as information related to the source picture size and the target picture size that is included as part of a DIP packet could be stored into one or more registers that control the functions of the scale engine 352.

FIGS. 10–14 are specifically related to the use of DIPs during a scaling process using video processor 350 in a specific embodiment.

In one embodiment of the present disclosure, the DIP sequencer accesses DIPs stored in device memory 390 and provides information representing macroblocks to the video processor 350. Generally, the DIP data provided to the transcoder 350 will be compressed data representative of a macroblock of video. By providing the data to the video processor 350, along with appropriate decompression information, the video processor can decompress the data to derive the decompressed macroblock data. For purposes of discussion it is to be understood that there may be several decompression processes performed by the video processor 350 before uncompress macro buffer data is stored in scale buffer 351. However, for purposes of discussion, it will be stated that the DIP sequencer 345 provides macro block data to the scale buffer. It should be further understood, that in another embodiment of the present disclosure that the DIP sequencer would perform some or all of the decompression functions performed by the video processor.

Once macro block data is stored in the scale buffer 351 of the scale block 360, the scale engine 352 can access the macroblock data stored in the scale buffer 351 to provide scaled macroblocks the scale engine can use traditional scaling methods, or the scaling methods disclosed herein to generate scaled images. In order to better facilitate understanding of the present invention, it is useful to reference FIG. 10, which illustrates the relationship of macroblocks with respect to an image frame.

Figure 10:
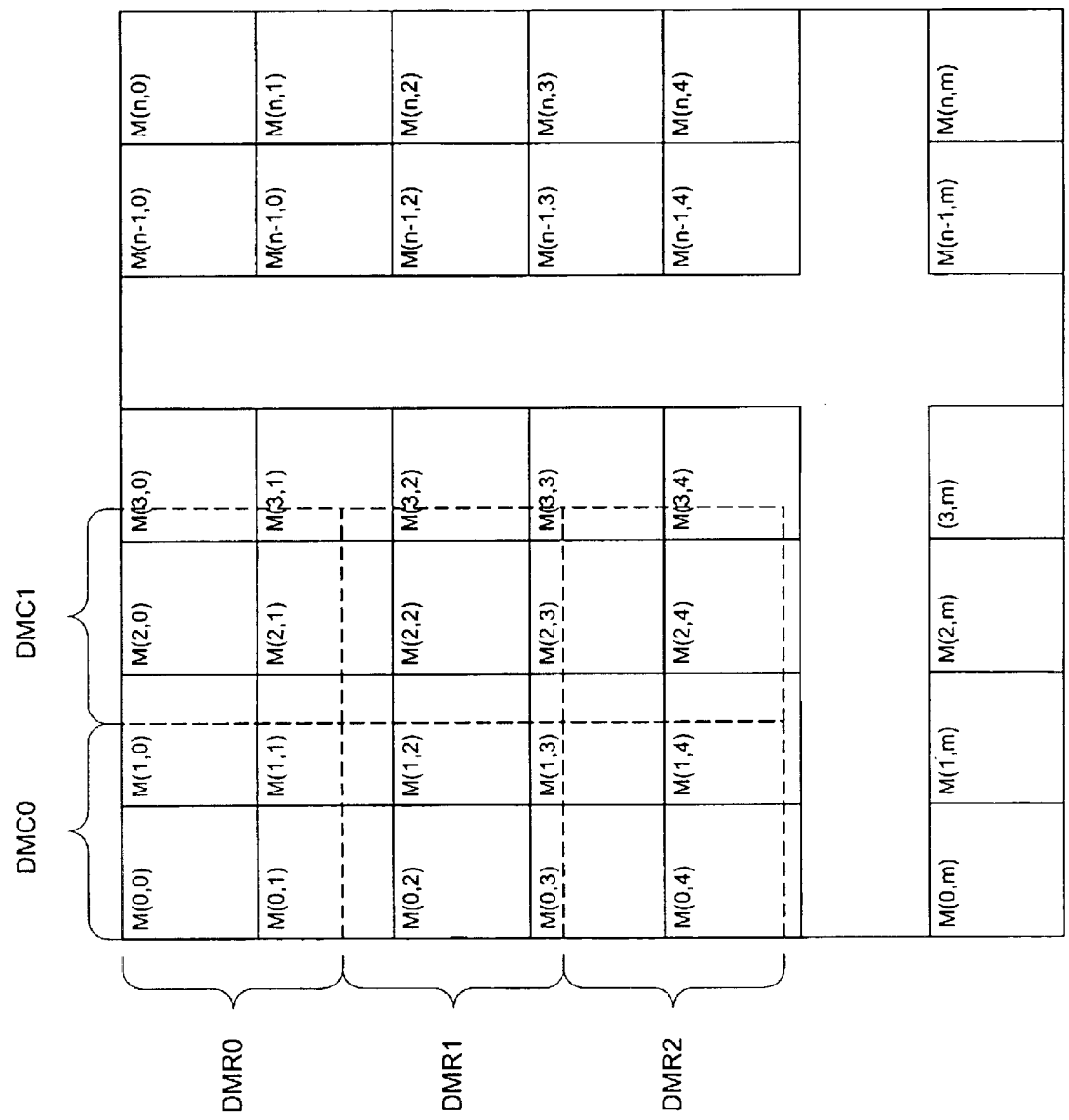
FIG. 10 illustrates the relationship of source macroblocks and destination macroblocks relative to a picture frame.

FIG. 10 illustrates a frame of video comprising macroblocks M(0,0) through M(n,m). For purposes of discussion, the macroblocks of FIG. 10 are described to represent a frame of data, however, in other embodiments the macroblocks of FIG. 10 can actually represent a field of data, or only a portion of a frame or field.

The frame of FIG. 10 will be associated with a specific resolution. For example, the frame of FIG. 10 can be considered a source frame having a resolution of 1920 pixels by 1080 pixels. Since each macroblock represents a 16 pixel by 16 pixel portion of the frame, the number of macroblocks used to represent a frame is dependent upon the resolution of the frame. It should be noted that, while the term macroblock has a specific meaning, for purposes of discussion and/or implementation block sizes other than a traditional macroblock can be used in other embodiments of the present invention.

In operation, the macroblocks of the frame illustrated in FIG. 10 are stored in the scale buffer 351 prior to being accessed by the scale engine 352, which creates destination macroblocks representing a scaled image. For example, to generate a destination image having a resolution of less than 1920 by 1080, for example a resolution of 1280 by 720, it would be necessary for the scale engine 352 to access multiple source macroblocks. As illustrated in FIG. 10, four macroblocks would be needed in order to generate a new destination macroblock DM(DMR0,DMC0), which is the macroblock associated with the row labeled DMR0 and the column labeled DMC0. In other words, when an image is being scaled down, a single destination macroblock is generated from more than one source macroblocks.

For the scale engine 352 to perform a scaling efficiently, the source macroblocks should be available to the scale engine 352 through the scale buffer 351. In accordance with a specific embodiment of the present disclosure, this is accomplished by loading in a first set of macroblocks, such as a slice of data (i.e., the first row of macroblocks (0,0) through (n,0)) or a first plurality of slices. A new destination slice will generate a new row or macroblocks containing horizontal data bounded by DMR0. Therefore, a single slice of source macroblocks does not contain enough macroblock data to generate the destination macroblocks used to represent a new slice. In accordance with a specific embodiment of the disclosure, only a portion of a row of macroblocks is also loaded. For example, to generate the destination macroblock DM(DMR0, DMC0) at least the source macroblocks M(0,1) and M(1,1) for the second row of macroblocks M(x,1) are needed. This specific embodiment provides for efficiencies over known methods by allowing for destination macroblocks to be generated by storing less than an entire slice of video data into the scale buffer, thereby reducing the size of the scale buffer.

The source macroblocks no longer needed to generate a subsequent destination macroblock can be overwritten once the destination macroblock is generated. Note that the size of the scale buffer in this embodiment will be determined by the actual scale factor being implemented, or by the maximum scale factor that can be implemented. For example, referring to FIG. 10, it can be seen that as many as nine source macroblocks can be needed to generate a destination macroblock (see M(DMR1,DMC1) for the destination block size indicated. In this embodiment the scale buffer would need to accommodate storing two slices, plus three additional macroblocks of a third slice. A greater portion of the third slice can be included when it is desirable to provide additional buffering to assure the scale engine 352 does not stall.

Figure 11:
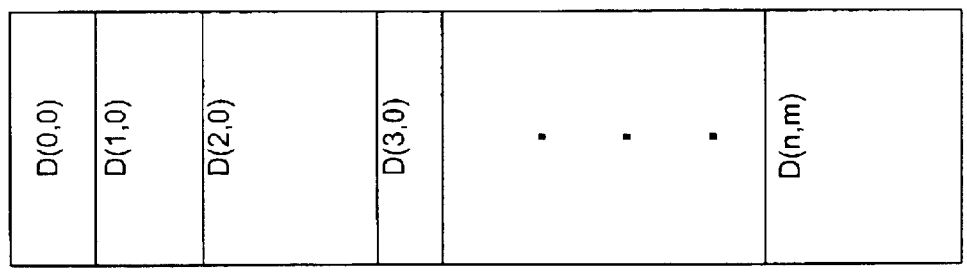
FIG. 11 illustrates data instruction packets as stored in linear address space in a specific embodiment of the present invention.

One advantage of this embodiment is that since the source macroblocks are stored sequentially, for example relative to scan order, the DIP packets representing the macroblocks are accessed sequentially. FIG. 11 illustrates DIP packets for each of the macroblocks stored immediately sequential in the address space. In accordance with a specific embodiment of the disclosure, each of the DIP packets can have a different size. By accessing the DIP packets sequentially allows the DIP sequencer to determine where one packet begins and another packet ends. Therefore, all of the DIP packets associated with a specific slice of macroblocks can be stored sequentially in memory 390, thereby allowing adjacent macroblocks to be accessed from memory 391 sequentially.

Figure 12:
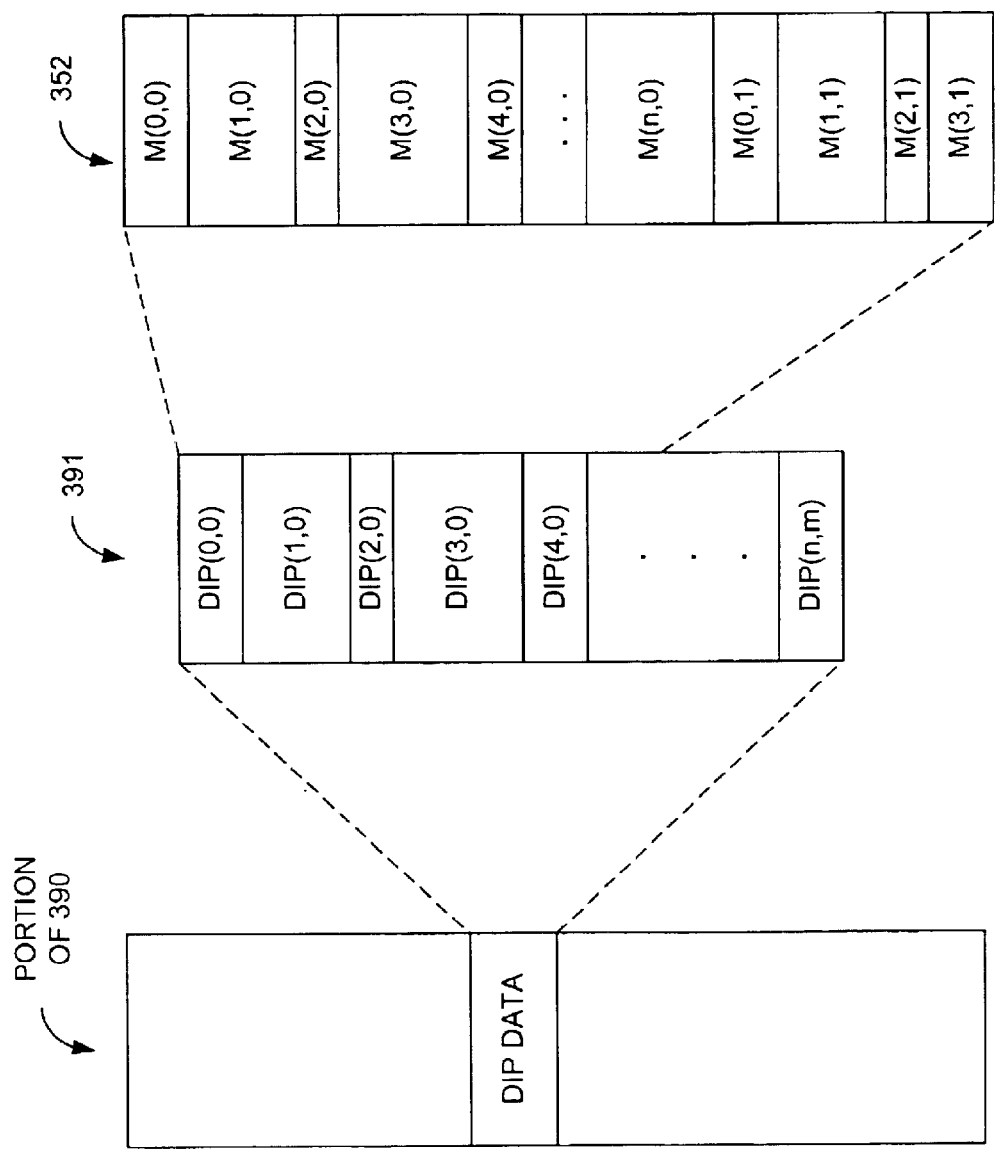
FIG. 12 illustrates data instruction packet information as stored in the memory device and its corresponding macroblock information stored in a scale buffer.

FIG. 12 illustrates the DIP data 391 stored in a portion of memory device 390, which maybe frame memory, or cache memory. The DIP data 391 is stored in sequential manner in memory from DIP (0,0) through DIP (n,m) as illustrated by the memory representation 391. In one embodiment, the location of each subsequent DIP is discernable only after a current DIP is read. Generally, this is accomplished by storing the DIPs in immediately adjacent locations to each other, relative to linear memory space. Memory representation 352, which illustrates data stored in the scale buffer 352, represents the macroblock data generated from the DIP data 391. Note that in FIG. 12 it is illustrated that the macroblocks associated with the first slice, and macroblocks M(0,1) through macroblock (3,1) are stored. While this is more than the number of macroblocks needed to generate the destination macroblock M(DMR0,DMC0), it allows for additional information to be stored to assure the scale engine 352 does not stall. It will be appreciated that additional scale buffer sizes may be used depending upon the latency designed into the present invention.

Figure 13:
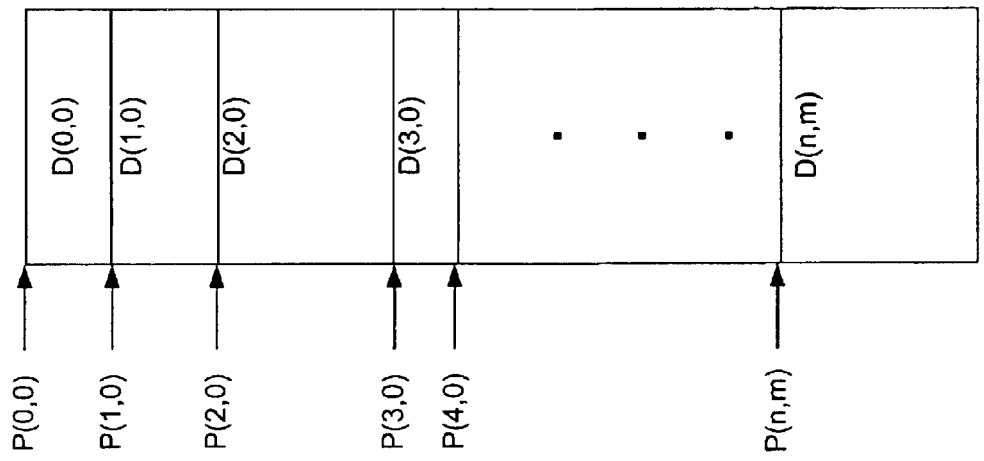
FIG. 13 illustrates data instruction package information as stored in linear address space in accordance with another embodiment of the present invention.
Figure 14:
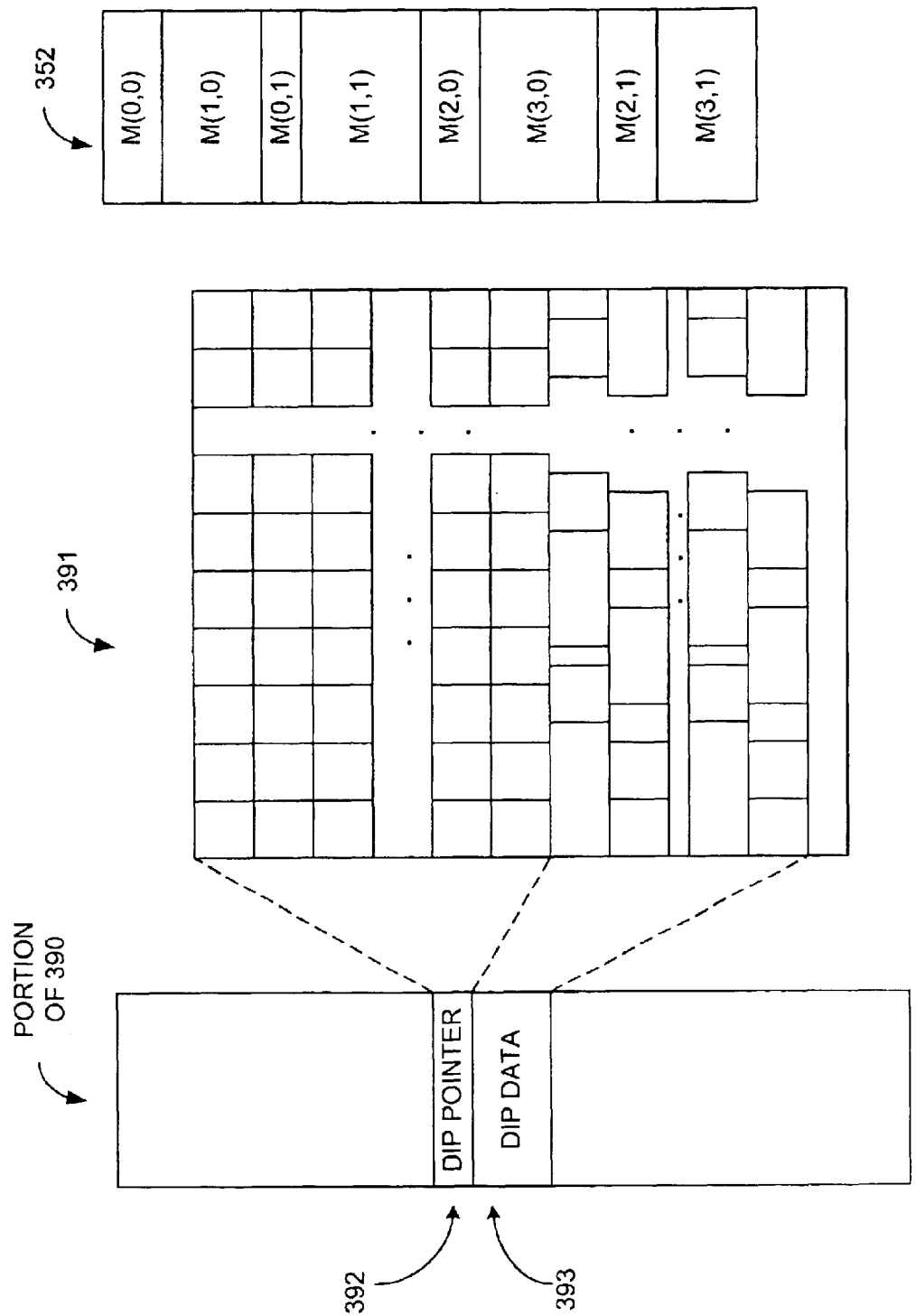
FIG. 14 illustrates data instruction packet information and data instruction packet pointers stored in device memory and it corresponding macroblock information in a scale buffer.

FIGS. 13 and 14 illustrate another embodiment of the present disclosure whereby a scale buffer 351 having yet a smaller size can be utilized by storing only those source macroblocks needed to generate an immediate destination macroblock. It will be appreciated that it is necessary for the system of FIG. 9 to access the specific DIPs out of order, relative to their scan sequence, to decode a specific destination macroblock. FIG. 13 illustrates DIP data stored in a specific sequence 353 whereby pointers are indicated that identify the location of specific DIPs. As further indicated in FIG. 14, the pointers to each of the individual DIPs, representing a specific macroblock, are stored in a DIP pointer table portion of the memory 390.

In one embodiment, the pointer values are stored in the DIP pointer portion in such a manner that there is a known spacing between each pointer. For example, pointer values can be stored in immediately adjacent words. By having pointers stored at known, or readily calculable locations, it is possible for the DIP input control module 346 to access specific DIPs based upon a destination macroblock that is to be generated. Being able to access DIPs out of order represents an advantage over the know art, and the previously describe method, in that a scale buffer having a reduced size is realized since it is only necessary to accommodate those source macroblocks needed by the scale engine 352 to generate a specific destination macroblock. Therefore, it is possible for the DIP input control module 346 to access just those source DIPs needed to generate a desired destination macro block. For example, referring again to FIG. 14, it is possible to access only the DIPs associated with macroblocks M(0,0), M(1,0), M(1,0), and M(2,0) to generated the destination macroblock M(DMR0, DMC0).

In accordance with one embodiment of the present disclosure, the source DIPs are stored within the memory 390 in the actual scan order. In another embodiment, the source DIP packets are stored in an expected access order such as a scale order. The term scale order is used to indicate the order that source macroblocks need to be accessed to accommodate generation of a destination macroblocks in specific order. For example, while the scan order sequence for macroblocks is left to right across each row of macroblocks, starting with the top row and proceeding to the bottom row, the scale order sequence is based upon the order that the destination macroblocks are to be generated. Therefore, where an order of destination macroblocks to be generated is M(DMR0,DMC0) followed by M(DMR0, DMC1), one example of a scan sequence would be to access the source macroblocks in the following order: M(0,0), M(1,0), M(0,1), M(1,1), M(2,0), M(3,0), M(2,1), M(3,1). Note that since the macroblocks M(0,0) and M(1,0) are used to generate only the macroblock M(DMR0,DMC1), they can be overwritten by subsequent macroblocks once they are no longer needed.

Since a pointer table is maintained indicating where each sequential DIP is stored, the actual order the DIP itself is stored in memory is not as important for purposes of knowing where the DIP is stored. However, in another embodiment the DIPS are stored in a scale access order, as opposed to a scan access order, to improve the likely hood that data that is to be accessed immediately sequential is stored on a common page of memory, thereby reducing latency associated with accessing DIP data from memory. Likewise, it will be appreciated that the actual order that the DIP pointers are saved can be based upon the scale sequence, or in a sequential manner other than scan sequential. For example, the pointers themselves could be stored in a manner to access sequential DIPS relative to a scan access sequence.

Figure 15:
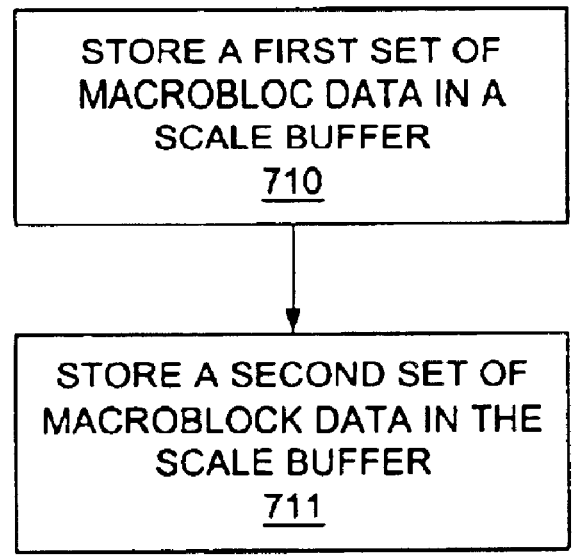
FIGS. 15–19 illustrate specific methods in accordance with the present invention.

FIGS. 15–18 illustrate specific methods in accordance with the present disclosure. FIG. 15 illustrates a specific method of storing information in accordance with the present disclosure whereby, at step 810, a first set of macroblocks is stored in a scale buffer. In one embodiment, the first set of macroblocks will comprise one or more slices of video information related to a specific picture frame. By storing macroblocks associated with one or more entire slices, it is possible for the beginning and end of each adjacently stored DIP to be determined.

At step 811, a second set of macroblock data is stored into the scale buffer. The second set of macroblock data represents a portion of a slice of frame data. As previously discussed, in one embodiment, the second set of data includes those macroblocks of a video slice that are needed to begin generation of a new scaled set of macroblocks.

Figure 16:
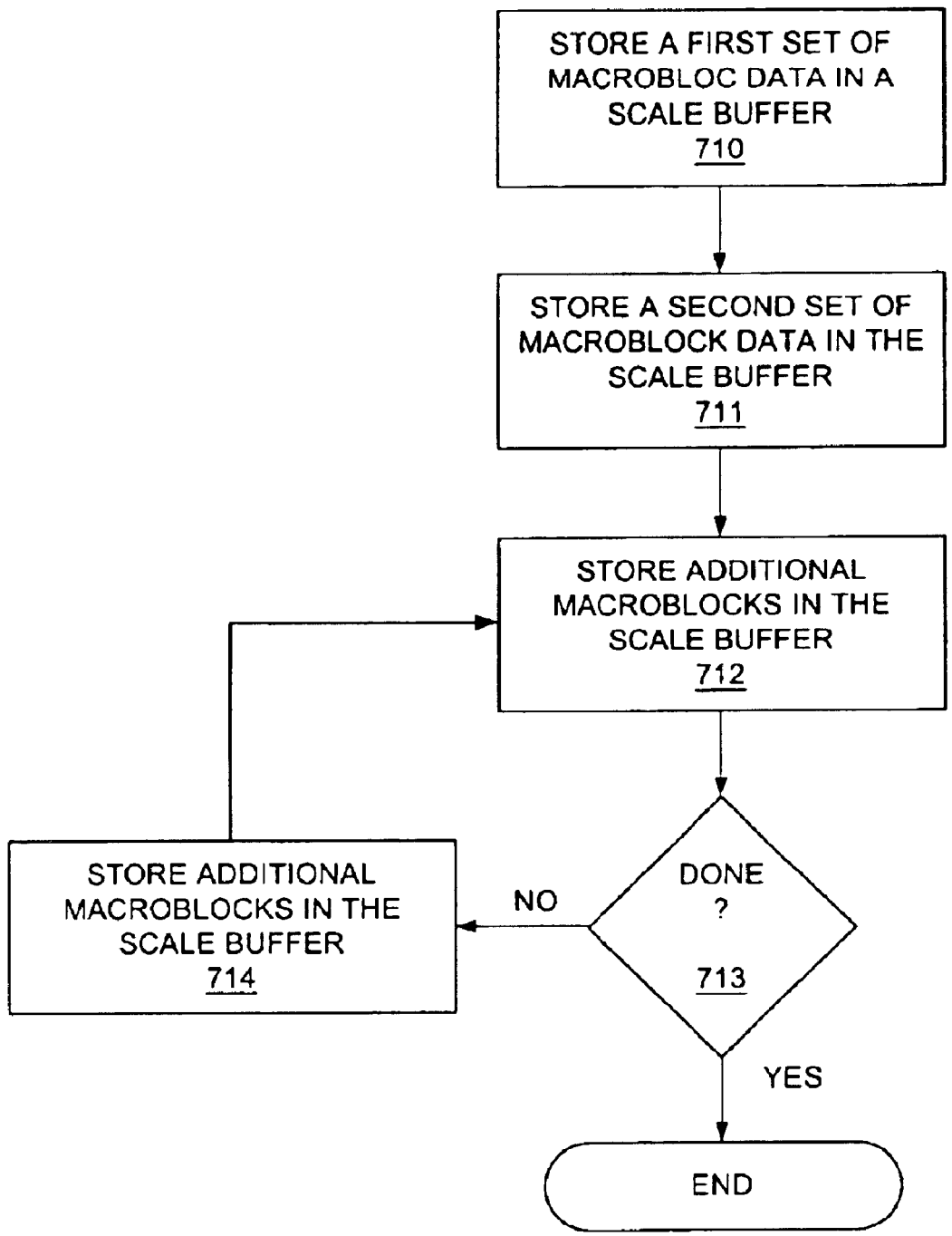

FIG. 16 illustrates another method in accordance with a specific embodiment of the present disclosure. The method of FIG. 16 includes steps 810 and step 811 as has been described with reference to FIG. 15. At step 812 additional macroblocks are stored into the scale buffer. For example, while steps 810 and 811 may store only enough source macroblocks to allow scaling of new destination macroblocks to begin, the storing of additional source macroblocks in the scale buffer allows for additional destination macroblocks to be generated without stalling the scale engine 352. For example, if the maximum number of second set macroblocks needed to generate a single new destination macroblock is three, step 812 could store enough additional macroblocks (i.e., six macroblocks) to assure that the scale buffer always has enough information to proceed with the generation of a scaled macroblock without stalling.

At step 813 a determination is made whether the method of FIG. 16 has stored all macroblocks associated with a frame buffer in the scale buffer. If all macroblocks have been stored, the flow is finished. If all the macroblocks in the frame have not been stored the flow proceeds to step 814, whereby the next macroblock is stored in the frame buffer. It will be appreciated that storing the next macroblock at step 814 can overwrite a previous macroblock no longer used. The method of FIG. 16 illustrates a method where one or more entire slices of data and a portion of a subsequent slice of data are used to avoid storing only entire slices of video. In addition, the method the FIG. 16 facilitates the use of DIPS which have been stored in a scan sequential manner without the use of a pointer table.

Figure 17:
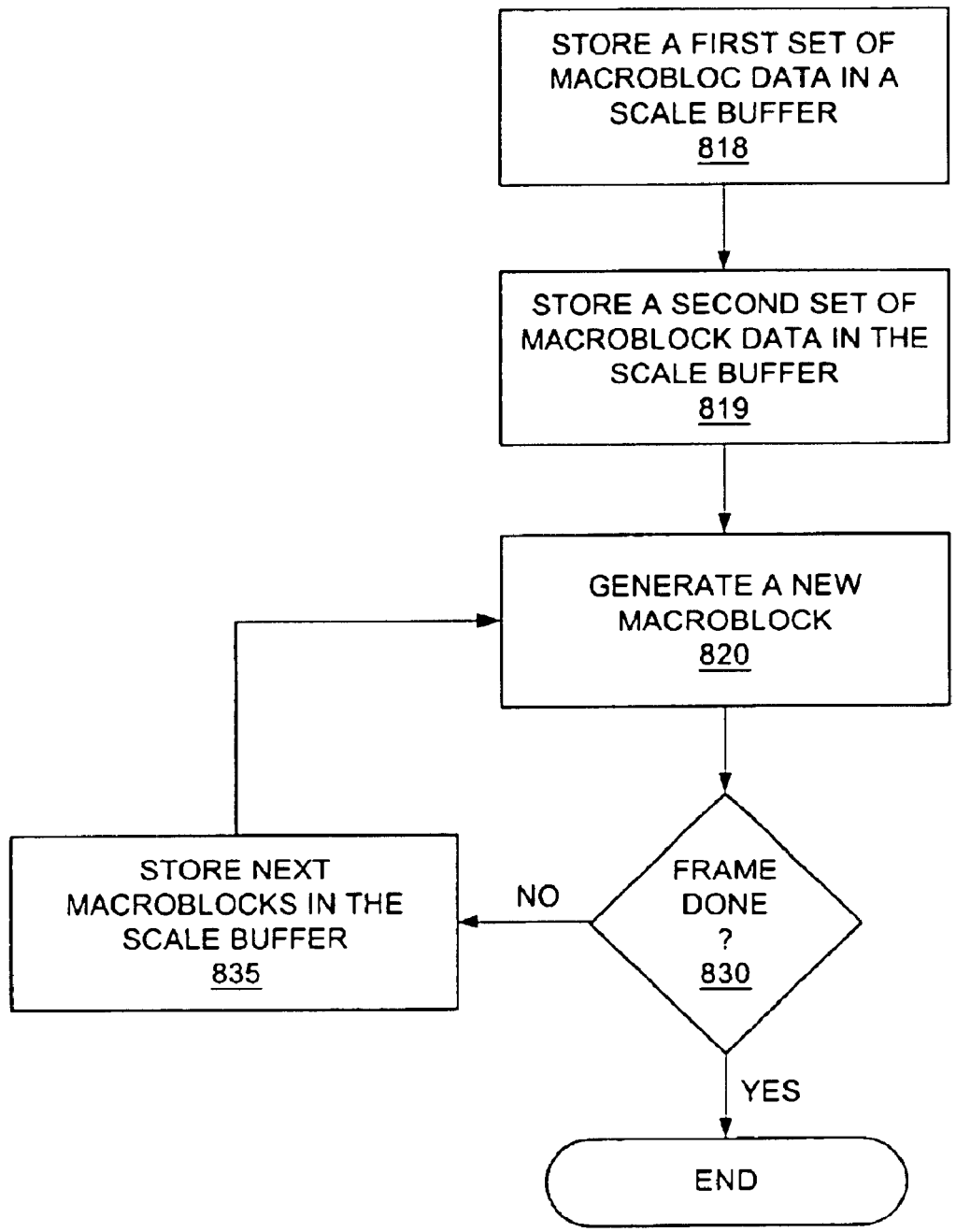

The method of FIG. 17 is generally analogous to the method of FIG. 16. Steps 818, and 814 are used to load the initial macroblocks into a scaled buffer. Subsequently, at step 820 a new macroblock is generated based upon the stored information. Once the new macroblock is generated, the flow proceeds to step 830 where it is determined whether or not the frame buffer has been completed. If not, the flow proceeds to step 835 where the next macroblock is loaded and the flow returns to step 820 wherein a new macroblock is generated. This loop repeats itself until the entire frame has been generated.

Figure 18:
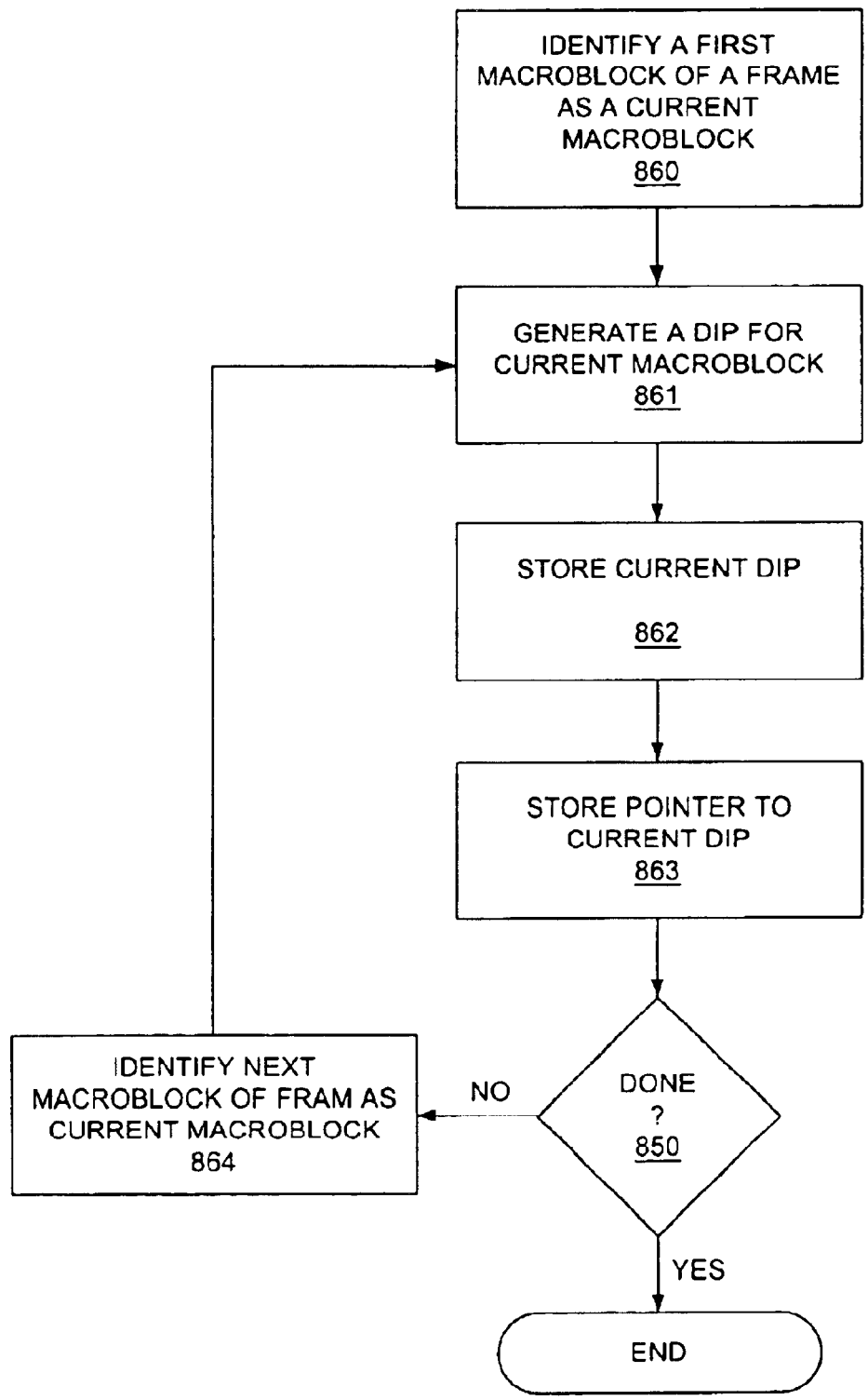

FIG. 18 illustrates a method for generating DIPs in accordance with another embodiment of the present disclosure. At step 860, a first macroblock of a frame is identified as a current macroblock. Generally a first macroblock of a frame the macroblock which contains the pixel which will be the first pixel displayed, or scanned, on a display device. Typically, this will be the top left macroblock of a specific frame.

In one embodiment, the first macroblock of a specific frame is identified from an elementary stream stored in memory. The elementary stream is generally stored in memory as a result of receiving digital video data, such as an MPEG stream.

At step 861 a DIP is generated for the current macroblock. In one embodiment, the DIP is generated by including a DIP opcode and a representation of the video data accessed from memory into a payload portion of a DIP packet, where the opcode indicates that the DIP packet contains macroblock information. In another embodiment, it would be possible to first process the macroblock information accessed from the elementary stream data to create a specific format for the macroblock data before being stored in the DIP.

At step 862 the current DIP is stored to memory. In one embodiment, the current DIP can be stored into a circular buffer associated with a frame buffer. In this embodiment, the DIP would be readily accessed by a subsequent portion of the video processing device. In another embodiment, the DIPs would be stored to a system memory resource, such as a hard drive for access later by the video processing device.

At step 863 the pointer to the current DIP is stored in a DIP pointer location. Because the DIPs can have variable sizes it can be beneficial to keep track of the current DIP's location by having a pointer indicating where the current DIP is stored. This allows the current DIP to be subsequently accessed out of order. The pointer would be stored in a pointer location of the memory in a readily deterministic known manner. For example, each of the pointers can have a fixed size thereby resulting in a fixed distance between pointers. This is advantageous when it is desirable to load only those macroblocks to the scale buffer that are needed to generate a specific macroblock, thereby reducing the required size of the scaled buffer.

At step 840 a determination is made as to whether or not the flow of FIG. 18 is done. In one embodiment the flow of FIG. 18 is done when an entire frame of data has been processed by generating DIPs from the elementary stream of a specific frame or when there is no more data to process. If the process is done, the flow terminates otherwise the flow proceeds to step 864.

At step 864, a next macro block of the frame is identified as a current macro block. In one embodiment the next macro block is the next macro block in scan sequential order. In yet another embodiment, the next macroblock will be the next macro block anticipated to be accessed. For example, the next macroblock to be accessed can be the next macroblock in scale sequential order.

Figure 19:
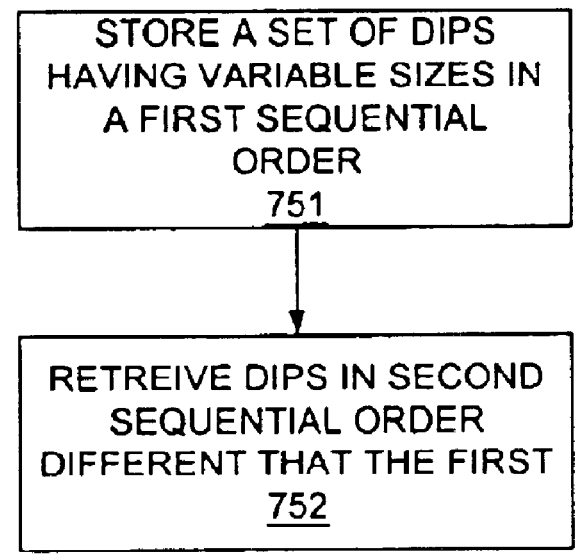

FIG. 19 illustrates another method in accordance with a specific embodiment of the present disclosure. Specifically, at step 851, a set of variable sized DIPS are stored in a first sequential order. The first sequential order can be represented by a scan sequential order, by a scale sequential order, or any other ordering.

Next, at step 852, the stored DIPS are accessed in a second sequential order different than the first sequential order. For example, if the DIPS were stored in a scan sequential order at step 851 the DIPS could be accessed in a scale sequential order at step 852. As previously described, DIPS can be accessed in a different order by having a pointer table with entries indicating where each DIP is stored in memory. Therefore, if the DIPS are stored in a first sequential manner, such as a scale sequential manner, it would still be possible to access the DIPS out of order without parsing through multiple DIPS to determine where a specific DIP begins. An embodiment implementing the specific embodiment illustrated in FIG. 19 would be advantageous in embodiments where just those macroblocks needed to generate a specific new macro block are to be stored in the scale buffer.

Referring to FIG. 3, the bit manipulator 335 is coupled to the general purpose data processor 330. In a specific embodiment, the general purpose data processor 330 is a microprocessor/microcontroller core integrated onto a semiconductor device as part of an application specific integrated circuit (ASIC) herein described. Likewise, the bit manipulator 335 is integrated onto the ASIC, and is accessible by the processor 330 to support bit manipulation of data.

In one operating embodiment, the processor 330 provides read requests to the microcontroller 340. The processor 330 can generate read requests in response to a variety of situations, including when: data at a new address is being requested; data buffered in the bit manipulator reaches a predefined watermark; and, when the processor 330 determines an amount of data available in the bit manipulator 335 is less than a predetermined number of bytes. In one embodiment the processor 330 can determine an amount of data available in the bit manipulator by reading a register associated with the bit manipulator. In another embodiment the processor 330 can determine an amount of data available in the bit manipulator by receiving interrupts from the bit manipulator that indicate a specific amount of data has been used.

In the implementation illustrated, all data requested by the processor 330 is returned via the bit manipulator 335. Note that in other embodiments the processor 330 could indicate to the memory controller 340 which data is to be returned through the bit manipulator 335 and which data is to be returned directly to the processor 330. As illustrated data is returned to the bit manipulator 335 via a bus, such as a dedicated bus, a read bus, or a read/write bus.

In an alternate operating embodiment; the bit manipulator 335 can interface with the processor 330 such that its own memory control logic could request data from the memory controller 340.

Data received by the bit manipulator 335 can be subsequently accessed by the processor 330. In one embodiment, the data is accessed by processor 330 by reading registers associated with the bit manipulator 335. For example, the bit manipulator 335 can have a set of registers that return a specific number of bits from 1 to N, where N is the bus size of the processor's 330 read bus. In addition, the bit manipulator can have a bit offset register that indicates the location of the first bit of the data to be returned. In another embodiment, data can be accessed from the bit manipulator by providing control signals indicating a data size and providing appropriate control information.

Figure 20:
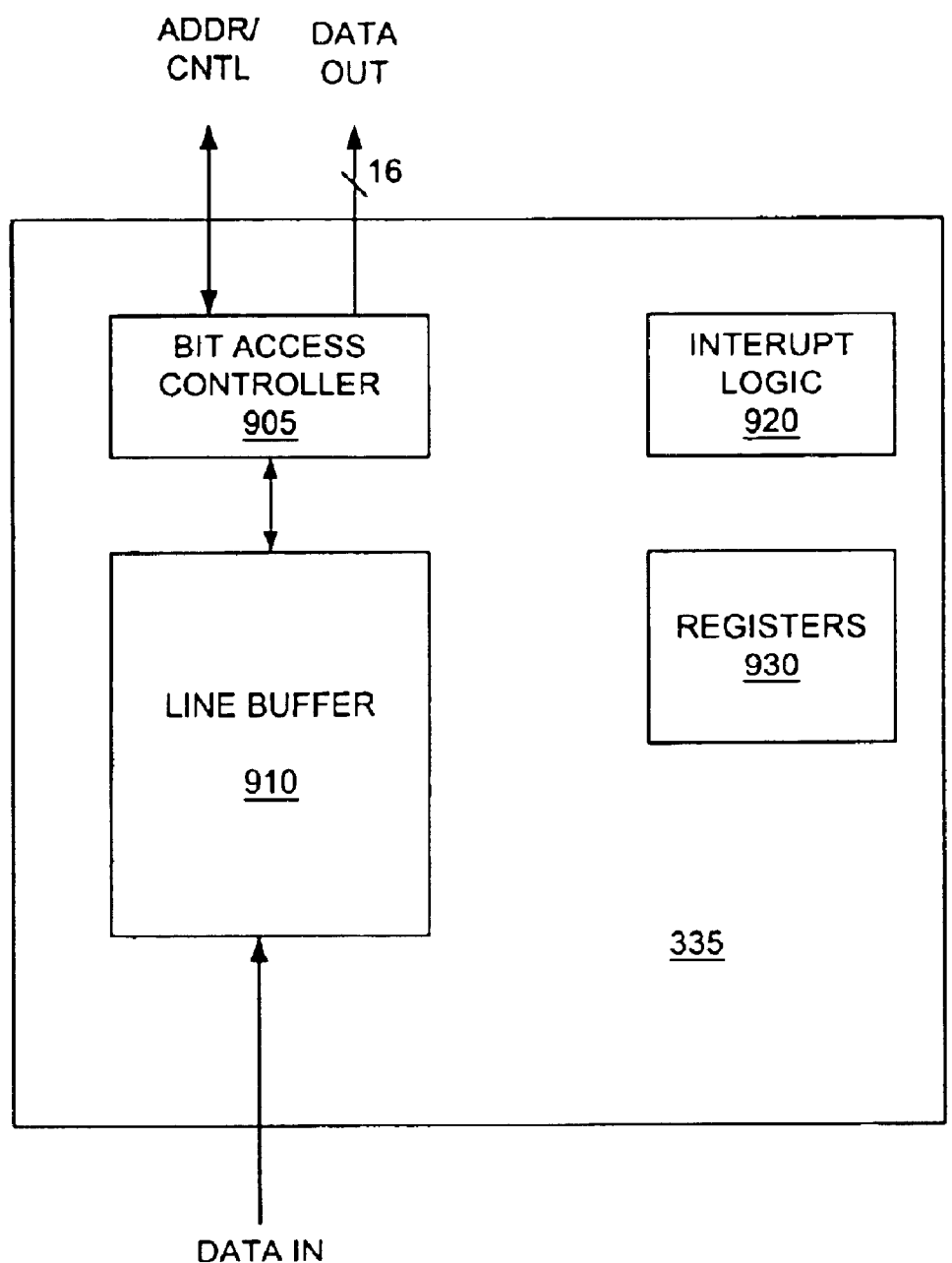
FIG. 20 illustrates a specific embodiment of the bit manipulator in greater detail.

FIG. 20 illustrates a specific implementation of the bit manipulator 335 including a line buffer 910, bit access controller 905, registers 930, and interrupt logic 920.

In one embodiment, the line buffer 910 is a circular buffer that acts as a first-in-first-out (FIFO) to store data returned from memory via the memory controller 340. In one embodiment the data received has a word sized based on the size of the data bus from the memory. For example the line buffer can receive 32 bit wide data words where the memory configuration supports a 32-bit word. In another embodiment the size of the data bus is based on the size of the data bus of the general purpose processor 330.

The bit access controller 335 receives request for specific data from the processor 330 and provides the specific bits requested over the data bus of the processor. Note that the size of the data bus between the processor 330 and the bit manipulator 335 can be different than the size of the data bus between the memory and the bit manipulator. In the example illustrated, the data bus to the processor 330 is a 16-bit wide bus. Based on the request from the processor 330 one to 16 bits of data will be returned. Note that when fewer than the maximum number of data bits are returned to the processor 330, the unused bits can be either one-filled, or zero-filled based on a predetermined setting, which can be a fixed or variable setting.

Registers 930 are accessible by the processor 330, and are operably coupled to the bit access controller 905 and line buffer 910. In one embodiment, as discussed in greater detail herein, the processor 330 can monitor the status of the bit manipulator 335, provide control to bit manipulator 335, and access data from the bit manipulator 335 by accessing the registers 930.

The interrupt logic 920 is used to track the amount of data available in the bit manipulator 335. In one embodiment, an interrupt is provided to the processor 330 every time a predefined amount of data in the line buffer 910 is used. In another embodiment, the predefined amount of data is user selectable by programming a register of register set 930 to indicate an interrupt should be generated every time a specific number of data has been read from the line buffer 910. For example, a register can be programmed to monitor 8-bits, 16-bits, 32-bits, 64-bits, or 128-bits of data has been used. In another embodiment, a total number of current bytes of data stored in the line buffer is maintained in a register of the register set 930.

By providing a way for the processor 330 to monitor the amount of data available in the line buffer, it is possible for the processor 330 to issue memory access requests to the memory controller 340, thereby assuring data is maintained in the bit manipulator. Also, by providing a way for the processor 330 to monitor the amount of data available in the line buffer, it is possible for the processor 330 to make sure data is available for cache storage before a request for data is issued to the bit manipulator 335. This allows the processor 330 to delay a data request to the bit manipulator 335 unless it is assured that reads to the bit manipulator will not stall a data access request that is to be cached.

Figure 21:
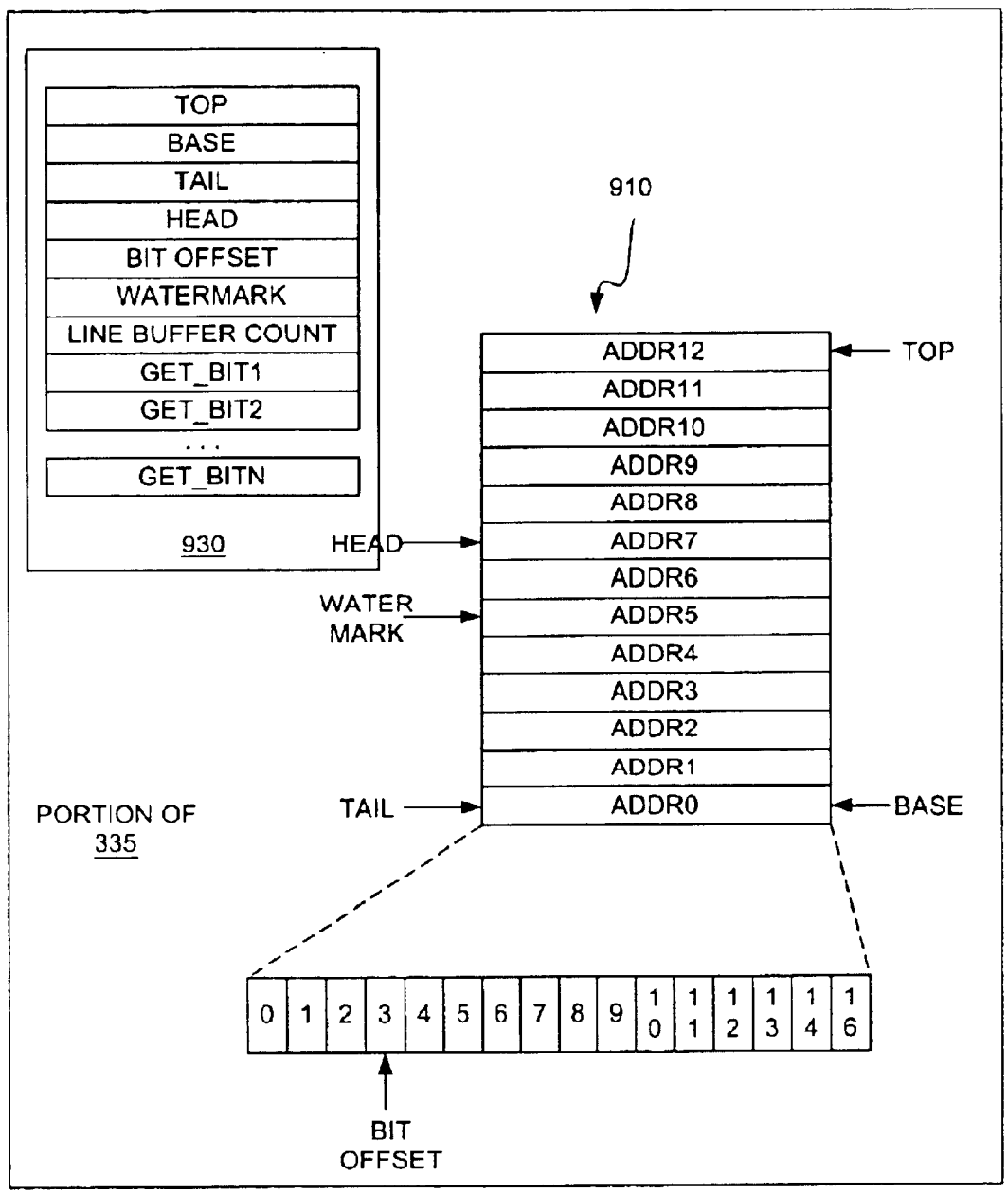
FIG. 21 illustrates specific embodiments of the bit manipulator's line buffer and registers in greater detail.

FIG. 21 illustrates portions of FIG. 20 in greater detail, including the register set 930 and the line buffer 910.

The register set includes a plurality of registers, including a top register and a base register which specify an address range in which the line buffer storage locations reside. A tail register pointer to a next valid line of the line buffer where data is to be accessed. Note that the pointers may indicate an actual line of the line buffer where data is to be accessed, or a line of the line buffer that is offset from the actual line buffer line where the data is to be accessed. The head register points to a next available line of the line buffer where valid data is to be stored.

A bit offset register indicates an offset to the first bit of the next set of bits to accessed. For example, FIG. 21 indicates the bit offset pointer pointing to bit 3. A bit indicated by the bit offset value will be the bit left justified by the bit manipulator output. Note, in an alternate embodiment, the bits returned could be right justified.

A watermark register stores a value that indicates when additional data needs to be loaded into the line buffer. The watermark value can indicate an offset from the tail or head pointer that is compared to the head or tail pointer respectively to determine when data is to be accessed. Alternatively, the watermark value can indicate a fixed location that is compared to the location of the tail pointer to determine when data is to be accessed. Various embodiments use the watermark to initiate a process of interrupting processor 330, or allowing processor 330 to read the watermark and other registers to determine when additional data is to be loaded into the bit manipulator.

As previously discussed, the line buffer count register can store a value indicating the amount of valid data associated with the line buffer. For example, the line buffer count register can indicate the number of bytes stored in the line buffer 910 that are yet to be accessed.

Figure 22:
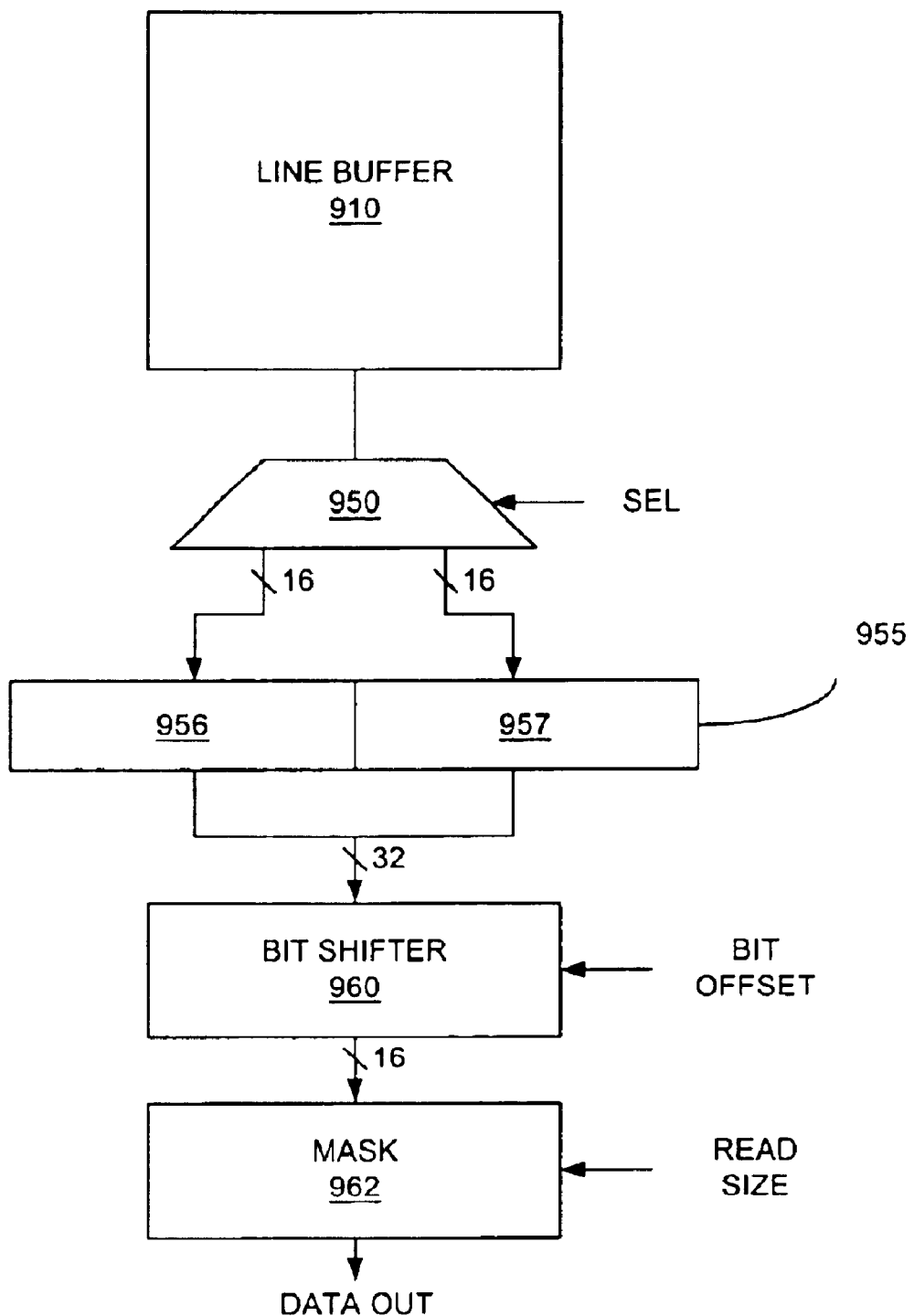
FIG. 22 illustrates a block diagram representing a functional data flow through the bit manipulator.

FIG. 22 illustrates a block diagram representing a the functional data flow through the bit manipulator 335. A storage location 955 stores data at least twice the size of the data bus to the processor 330. Since the first bit of the data word to be provided to the processor 330 can be located at any bit location, the word to be provided can be located within the next current two words. The multiplexer 950 is used to load a next word to the storage location 955 in response to the bit offset value transitioning from one word of location 955 to the next. Note that in the embodiment illustrated, the input to the multiplexer 950 is 16 bits wide. It will be appreciated that additional logic (not illustrated) can be used to provide the next 16-bits to the multiplexer 950.

Figure 23:
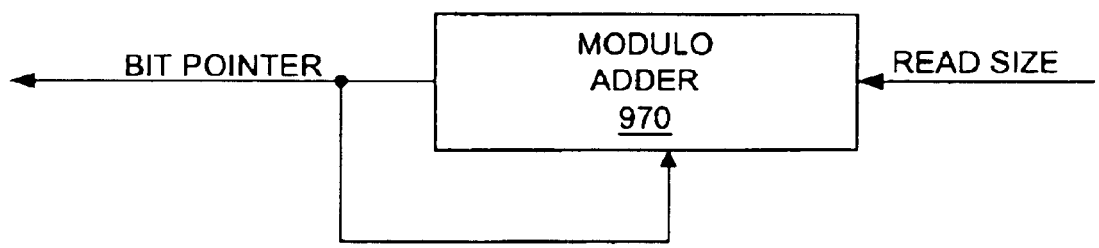
FIG. 23 illustrates in block diagram form a specific method or system for generating a bit offset pointer.

FIG. 23 illustrates in block diagram form a specific embodiment of updating the bit offset value. The embodiment illustrates a modulo adder that receives the value of the current bit offset value and the size of the number of bits to be read. The output of the adder provides a new bit offset value.

The bit shifter 960 aligns the bit values stored in location 955, based upon the bit offset, so that left most bits of data output by the bit shifter 960 are those specified by the bit offset value. The mask 962 zero-fills or one-fills the bits not specifically requested by a data request. For example, in one embodiment, if three bits of data are requested they will be left justified while the mask will zero-fill the right-most 13 bits.

In one embodiment of the present invention, accesses to the bit manipulator 335 are in response to a GET_BIT(X) function where X specifies a number of bits to be returned. Instead of using internal registers and processor operations, the processor 330 accesses a specific address location corresponding to a register of the bit manipulator 335. For example, 16 specific address locations (registers) can be used to implement sixteen commands GET_BIT(1) through GET_BIT(16), where the bit manipulator 335 returns the requested amount of data and updates the registers appropriately, including the bit offset value, which is incremented by the amount of the data read. In another embodiment, additional commands can be provided to the bit manipulator that accesses a specific number of bits but do not increment the bit offset register or the tail register. For example, in one embodiment an entire word of data can be accessed without incrementing the tail register., Specific examples of novel aspects of the present disclosure are indicated by items 1–22 listed below.

Item 1. A system comprising:
 a first data processor having an input data port, and an output control port:
 a memory having a data port to provide output data;
 a first bit access controller having an input data port coupled to the output data port of the memory, an input control port coupled to the output control port and an output data port coupled to the input data port of the first data processor, the first bit manipulator further including:
 a plurality of storage locations coupled to the input data port of the first bit manipulator, wherein each storage location stores data having N bit locations including a first bit and a last bit; and
 a bit shift module having an input port coupled to the plurality of line storage locations, and an output port coupled to the input data port of the first data processor, the shifter to provide at its output shifted bit values that are shifted relative to their storage location within the plurality of line storage locations, wherein the shifted bit values are shifted based on a value received at the input control port.

Item 2. The system of item 1 wherein the plurality of storage locations are part of a circular buffer.

Item 3. The system of item 2, wherein the circular buffer is used to form a first in first out buffer.

Item 4. The system of item 1, wherein the plurality of storage locations are part of a first in first out buffer.

Item 5. The system of item 1 further comprising a memory control portion having a first control port coupled to a control port of the bit manipulator, and a second control port coupled to a control port of the memory, wherein the memory control portion requests data from memory to be stored in the plurality of storage locations.

Item 6. The system of item 5 further comprising a watermark storage location to store a value to indicate the memory control portion is to request data from memory.

Item 7. The system of item 1 wherein the first data processor further comprises a general purpose processor.

Item 8. The system of item 7, wherein the general data processor includes a RISC type processor.

Item 9. The system of item 8, wherein the RISC type processor includes a MIPs based processor.

Item 10. The system of item 9 further comprising a video processor, wherein the video processor is separate from the first data processor.

Item 11. The system of item 9, wherein the video processor includes a video transcoder.

Item 12. The system of item 1 further comprising a storage location coupled to the first bit access controller to store a value indicating an amount of valid data stored in the plurality of storage locations.

Item 13. The system of item 1, wherein the first bit access controller further includes a interrupt output coupled to an input of the first data processor, where the interrupt output is to be asserted by the first bit access controller each time a predetermined number of storage locations of the plurality of storage locations is accessed.

Item 14. The system of item 13, wherein the storage location is accessed when it is loaded with data.

Item 15. The system of item 13, wherein the storage location is accessed when its data is read.

Item 16. A method comprising the steps of loading a plurality of data words into a storage location based upon a data request by a data processor; when in a first mode of operation receiving an indicator from the data processor to implement a get_bits request; providing data from the storage location in response receiving the indicator from the data processor.

Item 17. The method of item 16, wherein the step of providing further includes implementing the get_bits in hardware.

Item 18. The method of item 16, wherein the step of providing further includes user selectively implementing one of one-filling and zero filling.

Item 19. The method of item 16, further comprising the step of when in a second mode of operation the indicator from the data processor is to implement a Huffman decode.

Item 20. A method of using a general purpose data processor to access a portion of data bits of a plurality of data bits, the method comprising the steps of providing a first request for N data bits to a bit controller, the bit controller being separate from the general purpose data processor, where the first bit of the N data bits is not aligned on a byte boundary; receiving the N data bits from the bit controller; determining at the general purpose data processor if M data bits are available from the bit controller; when the M data bits are available from the controller providing a second request for M data bits to the bit controller.

Item 21. The method of item 20 wherein the step of determining includes accessing a register associated with the bit controller to determine if M data bits are available.

Item 22. The method of item 20 further comprising the steps of receiving an interrupt indicating an amount of data used by the bit controller, modifying an indicator based upon the interrupt, wherein the indicator is used during the step of determining to determine if M data bits are available.

In the preceding detailed description of the figures, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. For example, while the use of the bit shift module is described with reference to video applications, other hardware applications that are dependent on bit manipulation, such as data network routers and switch equipment, can benefit from the disclosed methodologies. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A video transcoding system comprising:
   a general purpose data processor comprising an input data port, and an output control port disposed at a semiconductor substrate;
   a video transcoder disposed at the semiconductor substrate comprising
      a video decoder,
      a video encoder, including a Huffman encoder, coupled to receive decoded video data from the video decoder,
      a storage area to store bits of compressed video data from the Huffman encoder in a bit level manner until a predefined amount of data is ready to be stored;
   a memory controller disposed at the semiconductor substrate comprising a first data port to interface with a memory external the semiconductor substrate; and a second data port coupled to the input data port of the general purpose data processor and to the video transcoder;
   a memory disposed at the semiconductor substrate comprising a plurality data words, each data word having a bit size of N, where N is based on a size of at least a portion of the second data port of the memory controller, each data word further having a first bit and a last bit; and
   a bit level data access controller disposed at the semiconductor substrate to access bit level data, the data access controller comprising
      an input data port coupled to the second data port of the memory controller,
      an input control port coupled to the output control port of the general purpose processor, and
      a data shifter comprising an input port coupled to the memory, and an output port coupled to the input data port of the general purpose data processor, the data shifter to provide at its output port bit values that are shifted relative to their storage location within a data word of the plurality of data words based on a value received at the input control port.

2. The system of claim 1, wherein the memory is dedicated to the bit level data access controller.

* * * * *